US012540940B2

(12) United States Patent
Labaer et al.

(10) Patent No.: US 12,540,940 B2
(45) Date of Patent: Feb. 3, 2026

(54) BIOMARKERS FOR THE EARLY DETECTION OF BREAST CANCER

(71) Applicants: ARIZONA BOARD OF REGENTS, Scottsdale, AZ (US); DANA-FARBER CANCER INSTITUTE, INC., Boston, MA (US); President and Fellows of Harvard College, Cambridge, MA (US)

(72) Inventors: Joshua Labaer, Chandler, AZ (US); Karen Sue Anderson, Chestnut Hill, MA (US); Garrick Wallstrom, Mesa, AZ (US); Sahar Sibani, Revere, MA (US); Niroshan Ramachandran, San Marcos, CA (US)

(73) Assignees: PRESIDENT AND FELLOWS OF HARVARD COLLEGE, Cambridge, MA (US); ARIZONA BOARD OF REGENTS, Scottsdale, AZ (US); DANA-FARBER CANCER INSTITUTE, INC., Boston, MA (US)

( * ) Notice: Subject to any disclaimer, the term of this patent is extended or adjusted under 35 U.S.C. 154(b) by 351 days.

(21) Appl. No.: 18/173,892

(22) Filed: Feb. 24, 2023

(65) Prior Publication Data
US 2023/0243829 A1 Aug. 3, 2023

Related U.S. Application Data

(60) Division of application No. 17/015,702, filed on Sep. 9, 2020, now Pat. No. 11,624,747, which is a division of application No. 15/818,975, filed on Nov. 21, 2017, now Pat. No. 10,802,026, which is a continuation of application No. 13/809,695, filed as application No. PCT/US2011/047741 on Aug. 15, 2011, now Pat. No. 9,857,374.

(60) Provisional application No. 61/373,359, filed on Aug. 13, 2010.

(51) Int. Cl.
*C12Q 1/68* (2018.01)
*C07K 14/47* (2006.01)
*C07K 17/00* (2006.01)
*C12Q 1/6886* (2018.01)
*C40B 40/10* (2006.01)
*G01N 33/574* (2006.01)

(52) U.S. Cl.
CPC ....... *G01N 33/57415* (2013.01); *C07K 14/47* (2013.01); *C07K 17/00* (2013.01); *C12Q 1/6886* (2013.01); *C40B 40/10* (2013.01); *C12Q 2600/158* (2013.01); *C12Y 301/27004* (2013.01)

(58) Field of Classification Search
None
See application file for complete search history.

(56) References Cited

U.S. PATENT DOCUMENTS

| | | |
|---|---|---|
| 7,402,403 B1 | 7/2008 | Robertson et al. |
| 9,141,756 B1 | 9/2015 | Hillis et al. |
| 9,442,111 B2 | 9/2016 | Lindsay et al. |
| 9,535,070 B2 | 1/2017 | Saul et al. |
| 9,857,374 B2 | 1/2018 | LaBear et al. |
| 9,938,523 B2 | 4/2018 | LaBaer |
| 10,045,990 B2 | 8/2018 | Festa et al. |
| 10,351,842 B2 | 7/2019 | LaBaer |
| 10,648,978 B2 | 5/2020 | Wang et al. |
| 2004/0048256 A1 | 3/2004 | Agee et al. |
| 2005/0130121 A1 | 6/2005 | Chong et al. |
| 2009/0136917 A1 | 5/2009 | Szalay et al. |
| 2010/0159469 A1 | 6/2010 | Harris et al. |
| 2014/0162902 A1 | 6/2014 | LaBaer et al. |
| 2014/0371091 A1 | 12/2014 | Wiktor et al. |
| 2015/0362497 A1 | 12/2015 | Anderson et al. |
| 2016/0041159 A1 | 2/2016 | LaBaer et al. |
| 2016/0195546 A1 | 7/2016 | LaBaer et al. |
| 2017/0045515 A1 | 2/2017 | Anderson et al. |
| 2017/0115299 A1 | 4/2017 | Saul et al. |
| 2017/0176423 A1 | 6/2017 | Anderson et al. |
| 2017/0363631 A1 | 12/2017 | LaBaer et al. |
| 2018/0201923 A1 | 7/2018 | LaBaer |
| 2018/0267029 A1 | 9/2018 | Wiktor et al. |
| 2018/0320230 A1 | 11/2018 | LaBaer et al. |
| 2019/0004051 A1 | 1/2019 | LaBaer et al. |
| 2019/0062728 A1 | 2/2019 | LaBaer et al. |
| 2019/0127778 A1 | 5/2019 | LaBaer et al. |
| 2019/0162725 A1 | 5/2019 | Magee et al. |

FOREIGN PATENT DOCUMENTS

| | | |
|---|---|---|
| JP | 6826870 | 5/2019 |
| WO | 2002/012067 A2 | 2/2003 |
| WO | 2003/012067 A2 | 2/2003 |
| WO | 2003/073911 A2 | 9/2003 |
| WO | 2005/010180 A1 | 2/2005 |

(Continued)

OTHER PUBLICATIONS

Barderas et al., 2009. Setting-up an antibody nucleic-acid programmable protein array (NAPPA) antibody microarray platform. Proteomica: revista de la Sociedad Española de Proteomica, 3, p. 101. (Year: 2009).*
Diez et al., 2015. NAPPA as a real new method for protein microarray generation. Microarrays, 4(2), pp. 214-227. (Year: 2015).*
He et al., 2008. Printing protein arrays from DNA arrays. Nature methods, 5(2), pp. 175-177. (Year: 2008).*
Link, A.J. and LaBaer, J., 2008. Construction of nucleic acid programmable protein arrays (NAPPA) 4: DNA biotinylation, precipitation, and arraying of samples. Cold Spring Harbor Protocols, 2008(11) 3, 1-5. (Year: 2008).*

(Continued)

*Primary Examiner* — Gary Benzion
*Assistant Examiner* — Olayinka A Oyeyemi
(74) *Attorney, Agent, or Firm* — McDonnell Boehnen Hulbert & Berghoff, LLP

(57) ABSTRACT

The present invention provides reagents and methods for breast cancer detection.

4 Claims, No Drawings

Specification includes a Sequence Listing.

(56) References Cited

FOREIGN PATENT DOCUMENTS

| | | |
|---|---|---|
| WO | 2005/106044 A1 | 11/2005 |
| WO | 2007/147265 A1 | 12/2007 |
| WO | 2008/021290 A2 | 2/2008 |
| WO | 2008/030845 A2 | 3/2008 |
| WO | 2008/106660 A1 | 9/2008 |
| WO | 2009/108917 A2 | 9/2009 |
| WO | 2010/083252 A2 | 7/2010 |
| WO | 2012/021887 A2 | 2/2012 |
| WO | 2013019680 A1 | 2/2013 |
| WO | 2013063126 A2 | 5/2013 |
| WO | 2013090364 A1 | 6/2013 |
| WO | 2014120902 A1 | 8/2014 |
| WO | 2014143954 A2 | 9/2014 |
| WO | 2014145458 A1 | 9/2014 |
| WO | 2015148202 A1 | 10/2015 |
| WO | 2015167678 A1 | 11/2015 |
| WO | 2015167678 A8 | 11/2015 |
| WO | 2015175755 A1 | 11/2015 |
| WO | 2016094558 A1 | 6/2016 |
| WO | 2016141044 A1 | 9/2016 |
| WO | 2017048709 A1 | 3/2017 |
| WO | 2017075141 A1 | 5/2017 |
| WO | 2017075141 A8 | 5/2017 |
| WO | 2017123648 A1 | 7/2017 |
| WO | 2017218677 A2 | 12/2017 |
| WO | 2018013531 A1 | 1/2018 |
| WO | 2018013531 A8 | 1/2018 |
| WO | 2019136169 A1 | 7/2019 |
| WO | 2019241361 A1 | 12/2019 |

OTHER PUBLICATIONS

Anderson, Karen S., et al., "Protein Microarray Signature of Autoantibody Biomarkers for Early Detection of Breast Cancer," J. Proteome Res., Jan. 2011, pp. 85-96, vol. 10, No. 1.

Anderson, Karen S., et al., In "Using custom protein microarrays to identify autoantibody biomarkers for the early detection of breast cancer," San Antonio Breast Cancer Symposium, San Antonio, TX, 2008. (abstract).

Anderson, Karen S., et al., "Application of protein microarrays for multiplexed detection of antibodies to tumor antigens in breast cancer." J. Proteome Res., Apr. 2008, pp. 1490-1499, vol. 7, No. 4.

Anderson, Karen S., et al., "The sentinel within: exploiting the immune system for cancer biomarkers," J. Proteome Res., Jul.-Aug. 2005, pp. 1123-1133, vol. 4, No. 4.

Anderson, N. Leigh, et al., "The human plasma proteome: history, character, and diagnostic prospects," Mol. Cell. Proteomics, Nov. 2002, pp. 845-867, vol. 1, No. 11.

Baugher, Paige J., et al., "Rac1 and Rac3 isoform activation is involved in the invasive and metastatic phenotype of human breast cancer cells," Breast Cancer Res., 2005, pp. R965-74, vol. 7, No. 6.

Breiman, Leo, "Random Forests." Mach. Learn., 2001, pp. 5-32, vol. 45.

Bouwman, Kerri, et al., "Microarrays of tumor cell derived proteins uncover a distinct pattern of prostate cancer serum immunoreactivity," Proteomics, Nov. 2003, pp. 2200-2207, vol. 3, No. 11.

Chapman, C., et al., "Autoantibodies in breast cancer: their use as an aid to early diagnosis," Ann. Oncol., May 2007, pp. 868-873, vol. 18, No. 5.

Chatterjee, Madhumita, et al., "Diagnostic markers of ovarian cancer by high-throughput antigen cloning and detection on arrays," Cancer Res., Jan. 2006, pp. 1181-1190, vol. 66, No. 2.

Chen, Kai-Yun, et al., "The role of tyrosine kinase Etk/Bmx in EGF-induced apoptosis of MDAMB-468 breast cancer cells," Oncogene, 2004, pp. 1854-1862, vol. 23, No. 10.

Chen, Yupeng, et al., "The molecular mechanism governing the oncogenic potential of SOX2 in breast cancer," J. Biol. Chem., Jun. 2008, pp. 17969-17978, vol. 283, No. 26.

Chen, Guoan, et al., "Autoantibody profiles reveal ubiquilin 1 as a humoral immune response target in lung adenocarcinoma," Cancer Res., Apr. 2007, pp. 3461-3467, vol. 67, No. 7.

Csepregi, Antal, et al., "Characterization of a lipoyl domain-independent B-cell autoepitope on the human branched-chain acyltransferase in primary biliary cirrhosis and overlap syndrome with autoimmune hepatitis," Clin. Dev. Immunol., Jun.-Dec. 2003, pp. 173-181, vol. 10, Nos. 2-4.

Desmetz, Caroline, et al., "Identification of a new panel of serum autoantibodies associated with the presence of in situ carcinoma of the breast in younger women," Clin. Cancer Res., Jul. 2009, pp. 4733-4741, vol. 15, No. 14.

Edwards, Brenda K., et al., "Annual report to the nation on the status of cancer, 1975-2002, featuring population-based trends in cancer treatment," J. Natl. Cancer Inst., Oct. 2005, pp. 1407-1427, vol. 97, No. 19.

Efron, B., "Bootstrap Methods: Another Look at the Jackknife," Ann. Stat., 1979, pp. 1-26, vol. 7, No. 1.

Esserman, M.D., Laura, et al., "Rethinking screening for breast cancer and prostate cancer," J. Am. Med. Assoc., Oct. 2009, pp. 1685-1692, vol. 302, No. 15.

Esserman, M.D., Laura, et al., "A role for biomarkers in the screening and diagnosis of breast cancer in younger women," Expert Rev. Mol. Diagn., Sep. 2007, pp. 533-544, vol. 7, No. 5.

Forti, Stefania, et al., "Identification of breast cancer-restricted antigens by antibody screening of SKBR3 cDNA library using a preselected patient's serum," Breast Cancer Res. Treat., Jun. 2002, pp. 245-256, vol. 73, No. 3.

Fossa ; Alexander, et al., "Serological cloning of cancer/testis antigens expressed in prostate cancer using cDNA phage surface display," Cancer Immunol. Immunother., May 2004, pp. 431-438, vol. 53, No. 5.

Gnjatic, Sacha, et al., "Seromic profiling of ovarian and pancreatic cancer," Proc. Natl. Acad. Sci., Mar. 2010, pp. 5088-5093, vol. 107, No. 11.

Grzmil, Michal, et al., "An oncogenic role of eIF3e/INT6 in human breast cancer," Oncogene, Jul. 2010, pp. 4080-4089, vol. 29, No. 28.

Gure, Ali O., et al., "Serological identification of embryonic neural proteins as highly immunogenic tumor antigens in small cell lung cancer," Proc. Natl. Acad. Sci. U.S.A., Apr. 2000, pp. 4198-4203, vol. 97, No. 8.

Gure, Ali O., et al., "Human lung cancer antigens recognized by autologous antibodies: definition of a novel cDNA derived from the tumor suppressor gene loc US on chromosome 3p21.3," Cancer Res., Mar. 1998, pp. 1034-1041, vol. 58, No. 5.

Harris, Lyndsay, et al., "American Society of Clinical Oncology 2007 update of recommendations for the use of tumor markers in breast cancer," J. Clin. Oncol., Nov. 2007, pp. 5287-5312, vol. 25, No. 33.

Hartmann, Lynn C., et al., "Benign breast disease and the risk of breast cancer," N. Engl. J. Med., Jul. 2005, pp. 229-237, vol. 353, No. 3.

Hattori, Takako, et al., "Rheumatoid arthritis-related antigen 47 kDa (RAA47) is a product of colligin-2 and acts as a human HSP47," J. Bone Miner. Metab., 2000, pp. 328-334, vol. 18, No. 6.

Hodi, F. Stephen, et al., "ATP6S1 elicits potent humoral responses associated with immunemediated tumor destruction," Proc. Natl. Acad. Sci., May 2002, pp. 6919-6924, vol. 99, No. 10.

Hudson, Michael E., et al., "Identification of differentially expressed proteins in ovarian cancer using high-density protein microarrays," Proc. Natl. Acad. Sci. U.S.A., Oct. 2007, pp. 17494-17499, vol. 104, No. 44.

Huttenhower, Curtis, et al., "Exploring the human genome with functional maps," Genome Res., Jun. 2009, pp. 1093-1106, vol. 19, No. 6.

Iejima, Daisuke, et al., "FRS2beta, a potential prognostic gene for non-small cell lung cancer, encodes a feedback inhibitor of EGF receptor family members by ERK binding," Oncogene, May 2010, pp. 3087-3099, vol. 29, No. 21.

Jager, Dirk, et al., "Identification of a tissue-specific putative transcription factor in breast tissue by serological screening of a breast cancer library," Cancer Res., Mar. 2001, pp. 2055-2061, vol. 61, No. 5.

Jager, Dirk, et al., Antibodies and vaccines—hope or illusion, Breast, Dec. 2005, pp. 631-635, vol. 14, No. 6.

(56) References Cited

OTHER PUBLICATIONS

Jager, Dirk, et al., Identification of tumorrestricted antigens NY-BR-1, SCP-1, and a new cancer/testis-like antigen NW-BR-3 by serological screening of a testicular library with breast cancer serum, Cancer Immun., Jun. 2002, p. 5, vol. 2.

Joos, Thomas O., et al., "Miniaturised multiplexed immunoassays," Curr. Opin. Chem. Biol., Feb. 2002, pp. 76-80, vol. 6, No. 1.

Kano, Satoshi, et al., "Tripartite motif protein 32 facilitates cell growth and migration via degradation of Abl-interactor 2," Cancer Res., Jul. 2008, pp. 5572-5580, vol. 68, No. 14.

Koziol, James A., et al., "Recursive partitioning as an approach to selection of immune markers for tumor diagnosis," Clin. Cancer Res., Nov. 2003, pp. 5120-5126, vol. 9, No. 14.

Kwok, Sukyee, et al., "Transforming growth factorbeta1 regulation of ATF-3 and identification of ATF-3 target genes in breast cancer cells," J. Cell. Biochem., Oct. 2009, pp. 408-414, vol. 108, No. 2.

Lichtenfels, Rudolf, et al., "Identification of metabolic enzymes in renal cell carcinoma utilizing PROTEOMEX analyses," Biochim. Biophys. Acta., Mar. 2003, pp. 21-31, vol. 1646, Nos. 1-2.

Macbeath, Gavin, et al., "Printing proteins as microarrays for high-throughput function determination," Science, Sep. 2000, pp. 1760-1763, vol. 289, No. 5485.

Mahul-Mellier, Anne-Laure, et al., "Alix and ALG-2 are involved in tumor necrosis factor receptor 1-induced cell death," J. Biol. Chem., Dec. 2008, pp. 34954-34965, vol. 283, No. 50.

Marchese, Rocio D., et al., "Optimization and validation of a multiplex, electrochemiluminescence-based detection assay for the quantitation of immunoglobulin G serotype-specific antipneumococcal antibodies in human serum," Clin. Vaccine Immunol., Mar. 2009, pp. 387-396, vol. 16, No. 3.

Mcclish, Donna K., "Analyzing a portion of the ROC curve," Med. Decis. Making, Jul.-Sep. 1989, pp. 190-195, vol. 9, No. 3.

Minenkova, Olga, et al., "Identification of tumorassociated antigens by screening phage-displayed human cDNA libraries with sera from tumor patients," Int. J. Cancer, Sep. 2003, pp. 534-544, vol. 106, No. 4.

Mira, Jean-Paul, et al., "Endogenous, hyperactive Rac3 controls proliferation of breast cancer cells by a p21-activated kinase-dependent pathway," Proc. Natl. Acad. Sci., Jan. 2000, pp. 185-189, vol. 97, No. 1.

Nese, M.D., Nalan, et al., "Comparison of the desmoplastic reaction and invading ability in invasive ductal carcinoma of the breast and prostatic adenocarcinoma based on the expression of heat shock protein 47 and fascin," Anal. Quant. Cytol. Histol., Apr. 2010, pp. 90-101, vol. 32, No. 2.

Palijan, Ana, et al., "Ligand-dependent corepressor LCOR is an attenuator of progesterone-regulated gene expression," J. Biol. Chem., Oct. 2009, pp. 30275-30287, vol. 284, No. 44.

Parkin, D. Max, et al., "Global cancer statistics, 2002," CA Cancer J. Clin., Mar.-Apr. 2005, pp. 74-108, vol. 55, No. 2.

Petricoin, Emmanuel, et al., "Clinical proteomics: revolutionizing disease detection and patient tailoring therapy," J. Proteome Res., Mar.-Apr. 2004, pp. 209-217, vol. 3, No. 2.

Qian, Jun, et al., "[Identification of digital differential expression patterns of a novel human gene (UBAP1) by an expressed sequence tag strategy]," [Ai zheng = Chinese Journal of Cancer], 2002, pp. 225-228, vol. 21, No. 3. (Abstract and figures translated).

Qiu, Ji, et al., "Development of natural protein microarrays for diagnosing cancer based on an antibody response to tumor antigens," J. Proteome Res., Mar.-Apr. 2004, pp. 261-267, vol. 3, No. 2.

Ramachandran, Niroshan, et al., "Self-assembling protein microarrays," Science, Jul. 2004, pp. 86-90, vol. 305, No. 5680.

Ramachandran, Niroshan, et al., "Next-generation highdensity self-assembling functional protein arrays," Nat. Methods, Jun. 2008, pp. 535-538, vol. 5, No. 6.

Ramachandran, Niroshan, et al., Tracking humoral responses using self assembling protein microarrays, Proteomics Clin. Appl., Oct. 2008, pp. 1518-1527, vol. 2, Nos. 10-11.

Richardson, Andrea L., et al., "X chromosomal abnormalities in basal-like human breast cancer," Cancer Cell, Feb. 2006, pp. 121-132, vol. 9, No. 2.

Robinson, William H., et al., "Autoantigen microarrays for multiplex characterization of autoantibody responses," Nat. Med., Mar. 2002, pp. 295-301, vol. 8, No. 3.

Schmoor, C., et al., "Long-term prognosis of breast cancer patients with 10 or more positive lymph nodes treated with CMF." Eur. J. Cancer, Jun. 2001, pp. 1123-1131, vol. 37, No. 9.

Sioud, Mouldy, et al., "Profiling the immune response in patients with breast cancer by phage-displayed cDNA libraries," Eur. J. Immunol., Mar. 2001, pp. 716-725, vol. 31, No. 3.

Stockert, Elisabeth, et al., "A survey of the humoral immune response of cancer patients to a panel of human tumor antigens," J. Exp. Med., Apr. 1998, pp. 1349-1354, vol. 187, No. 8.

Stoll, Dieter, et al., "Protein microarray technology," Front. Biosci., Jan. 2002, pp. c13-c32, vol. 7.

Storey, John D., "A direct approach to false discovery rates," J. R. Stat. Soc. B, 2002, pp. 479-498, vol. 64, Pt. 3.

Tamimi, Rulla M., "Endogenous hormone levels, mammographic density, and subsequent risk of breast cancer in postmenopausal women," J. Natl. Cancer Inst., Aug. 2007, pp. 1178-1187, vol. 99, No. 15.

Tamimi, Rulla M., "Endogenous sex hormone levels and mammographic density among postmenopausal women," Cancer Epidemiol. Biomarkers Prev., Nov. 2005, pp. 2641-2647, vol. 14, No. 11 Pt. 1.

Templin, Markus F., et al., "Protein microarrays: promising tools for proteomic research," Proteomics, Nov. 2003, pp. 2155-2166, vol. 3, No. 11.

Torres, Vicente A., et al., "Rab5 mediates caspase-8-promoted cell motility and metastasis," Mol. Biol. Cell, Jan. 2010, pp. 369-376, vol. 21, No. 2.

Tozlu, Sengul, et al., "Identification of novel genes that co-cluster with estrogen receptor alpha in breast tumor biopsy specimens, using a large-scale real-time reverse transcription-PCR approach," Endocr. Relat. Cancer, Dec. 2006, pp. 1109-1120, vol. 13, No. 4.

Wandall, Hans H., et al., "Cancer biomarkers defined by autoantibody signatures to aberrant Oglycopeptide epitopes," Cancer Res., Feb. 2010, pp. 1306-1313, vol. 70, No. 4.

Wang, Cheng-Chi, et al., "Glycan microarray of Globo H and related structures for quantitative analysis of breast cancer," Proc. Natl. Acad. Sci., Aug. 2008, pp. 11661-11666, vol. 105, No. 33.

Wang, Xiaoju, et al., "Autoantibody signatures in prostate cancer," N. Engl. J. Med., Sep. 2005, pp. 1224-1235, vol. 353, No. 12.

Witt, Abigail E., et al., "Functional proteomics approach to investigate the biological activities of cDNAs implicated in breast cancer," J. Proteome Res., Mar. 2006, pp. 599-610, vol. 5, No. 3.

Wong, Jessica, et al., "Rapid detection of antibodies in sera using multiplexed self-assembling bead arrays," J. Immunol. Methods, Oct. 2009, pp. 171-182, vol. 350, Nos. 1-2.

Wulfkuhle, Julia D., et al., "New approaches to proteomic analysis of breast cancer," Proteomics, Oct. 2001, pp. 1205-1215, vol. 1, No. 10.

Zhao, Hongjuan, "Different gene expression patterns in invasive lobular and ductal carcinomas of the breast," Mol. Biol. Cell, Jun. 2004, pp. 2523-2536, vol. 15, No. 6.

Zhou, Jin, et al., "A novel gene, NMES1, downregulated in human esophageal squamous cell carcinoma," Int. J. Cancer, 2002, 101 (4), 311-6.

Zhu, Henh, et al., "Global analysis of protein activities using proteome chips," Science, Sep. 2001, pp. 2101-2105, vol. 293, No. 5537.

International Search Report and Written Opinion for PCT/US2011/047741 mailed Mar. 23, 2012 (19 pages).

International Preliminary Report on Patentability for PCT/US2011/047741 issued Feb. 19, 2013 (11 pages).

Davis, et al., Amplification Patterns of three genomic regions predict distant recurrence in breast carcinoma, Journal of Molecular Diagnostics, 9(3): 327-336. Jul. 2007.

Pan, et al., "Involvement of the Conserved adaptor protein alix in actin cytoskeleton assembly," Journal of Biological Chemistry, 281(45): 34640-34650, Nov. 2006.

(56) References Cited

OTHER PUBLICATIONS

Zhao, et al., "different gene expression patterns in invasive lobular and ductal carcinomas of the breast," Molecular Biology of the Cell, 15(6): 2523-2536, Jan. 2004.
Thatcher, et al., "Regulation of zebrafish fin regeneration by microRNAs," Proceedings of the National Academy of Sciences, 105(47): 18384-18389, Nov. 2008.
Yamashita, et al., "Suppression of invasive characteristics by antisense introduction of overexpressed HOX genes in ovarian cancer cells," International Journal of Oncology, 28: 931, Apr. 2006.
Yoo, et al., "Transcriptional factor Late SV40 Factor (LSF) functions as an oncogene in hepatocellular carcinoma," PNAS, 107(18): 8357-8362, Apr. 2010.
European Search Report for EP3054299, mailed Oct. 16, 2016.
Madrid, et al. "Autoantibodies in breast cancer identify proteins involved in self-renewal and epigenetic chromatin remodeling" The Open Biomarkers Journal, 3: 13-20 (2010).
Tan, et al., "Serum autoantibodies as biomarkers for early cancer detection," FEBS Journal, 276: 6880-6900 (2009).
Cameron et al., (Plos ONE. Jan. 2009,4(1):e403(8 pages) doi:10.1371/journal.pone.0004303).
U.S. Appl. No. 16/097,791, LaBaer et al., filed Oct. 30, 2018.
U.S. Appl. No. 16/743,906, LaBaer et al., filed Jan. 15, 2020.
U.S. Appl. No. 16/791,640, LaBaer et al., filed Feb. 14, 2020.
Marella NV, Malyavantham KS, Wang J, Matsui S, Liang P, Berezney R. Cytogenetic and cDNA microarray expression analysis of MCF10 human breast cancer progression cell lines. Cancer Res. Jul. 15, 2009;69(14):5946-53. doi: 10.1158/0008-5472.CAN-09-0420. Epub Jul. 7, 2009. Erratum in: Cancer Res. Oct. 1, 2009;69(19):7894. PMID: 19584277; PMCID: PMC2826242.

\* cited by examiner

BIOMARKERS FOR THE EARLY DETECTION OF BREAST CANCER

CROSS-REFERENCE

This application is a divisional of U.S. application Ser. No. 17/015,702, filed Sep. 20, 2020, which is a divisional of U.S. application Ser. No. 15/818,975, filed Nov. 21, 2017, which is a continuation of U.S. application Ser. No. 13/809, 695, filed Feb. 27, 2013, which is a national stage application under 35 U.S.C. § 371 of International Application No. PCT/US2011/047741 filed Aug. 15, 2011, which claims priority to U.S. Provisional Patent Application Ser. No. 61/373,359 filed Aug. 13, 2010, incorporated by reference herein in their entireties.

STATEMENT OF U.S. GOVERNMENT INTEREST

This invention was made with government support under P50 CA089393 and U01 CA117374 awarded by the National Institutes of Health. The government has certain rights in the invention.

SEQUENCE LISTING STATEMENT

The sequence listing is filed in this application in electronic format only and is incorporated by reference herein. The sequence listing text file "10-294-PCT.xml" was created on Feb. 23, 2023, and is 95,937 bytes in size.

BACKGROUND

Despite recent advances in early detection and treatment, breast cancer remains a common and significant health problem in the United States. Women diagnosed with stage II and III breast cancer have a high-risk for distant recurrence and up to half of these women will develop metastatic disease, which remains incurable with current therapy. In this setting, there is intense effort in the search for biomarkers that can detect early disease, and to monitor for disease progression and recurrence. With the advent of molecularly-targeted therapeutics, biomarkers that are associated with biological subtypes of cancer may be useful for predicting responses to therapeutic interventions.

Proteomics-based approaches to distinguish cancer-bearing patient sera from healthy control sera have been challenged by the difficulty in identifying small quantities of protein fragments within complex protein mixtures, protein instability, and natural variations in protein content within patient populations. Autoantibodies (AAb) to tumor antigens have advantages over other serum proteins as potential cancer biomarkers as they are stable, highly specific, easily purified from serum, and are readily detected with well-validated secondary reagents. Although they have high specificities to distinguish cancer from control sera, most tumor AAb demonstrate poor sensitivities. Testing multiple antigens in parallel may serve to increase the predictive value of tumor-specific antibodies for use as immunodiagnostics.

Protein microarrays offer an emerging platform to present tumor antigens to screen for immune responses. In comparison to traditional ELISAs, protein microarrays are capable of presenting and assessing hundreds of tumor antigens simultaneously. The responses are rapidly identified because the address of each protein is known in advance and there are no representation issues; all proteins, even rare ones, are represented equally (usually in duplicate). The proteins are arrayed on a single microscope slide requiring only a few microliters of serum per assay. Known tumor antigens as well as predicted tumor antigens can be included to generate a comprehensive protein tumor antigen array. Despite some early demonstrations of feasibility, protein microarrays are not yet widely used, due to the labor and technical issues associated with production, purification, and quality control of proteins for spotting on the array, as well as difficulties with downstream validation assays of target AAb.

SUMMARY OF THE INVENTION

In a first aspect, the present invention provides polypeptide probe sets comprising:
  at least 2 different isolated polypeptides selected from the group consisting of ATP6AP1 (SEQ ID NO: 13), PDCD6IP (SEQ ID NO: 21), DBT (SEQ ID NO: 25), CSNK1E (SEQ TD NO: 9), FRS3 (SEQ TD NO: 3), RAC3 (SEQ TD NO: 15), HOXD1 (SEQ ID NO: 7), SF3A1 (SEQ ID NO: 1), CTBP1 (SEQ ID NO: 29), C15orf48 (SEQ ID NO: 35), MYOZ2 (SEQ ID NO: 33), EIF3E (SEQ ID NO: 39), BAT4 (SEQ ID NO: 5), ATF3 (SEQ ID NO: 19), BMX (SEQ TD NO: 45), RAB5A (SEQ TD NO: 23), UBAP1 (SEQ TD NO: 47), SOX2 (SEQ ID NO: 31), GPR157 (SEQ ID NO: 43), BDNF (SEQ ID NO: 17), ZMYM6 (SEQ ID NO: 41), SLC33A1 (SEQ ID NO: 11), TRIM32 (SEQ ID NO: 37), ALG10 (SEQ ID NO: 27), TFCP2 (SEQ ID NO: 49), SERPINH1 (SEQ ID NO: 51), SELL (SEQ TD NO: 55), ZNF510 (SEQ TD NO: 53), or antigenic fragments thereof, attached to the support.

In a second aspect, the present invention provides polynucleotide arrays comprising:
  (a) a support; and
  (b) at least 2 different isolated nucleic acids encoding polypeptides selected from the group consisting of ATP6AP1 (SEQ ID NO: 14), PDCD6IP (SEQ TD NO: 22), DBT (SEQ TD NO: 26), CSNK1E (SEQ ID NO: 10), FRS3 (SEQ ID NO: 4), RAC3 (SEQ ID NO: 16), HOXD1 (SEQ ID NO: 8), SF3A1 (SEQ ID NO: 2), CTBP1 (SEQ ID NO: 30), C15orf48 (SEQ ID NO: 36), MYOZ2 (SEQ ID NO: 34), EIF3E (SEQ ID NO: 40), BAT4 (SEQ ID NO: 6), ATF3 (SEQ ID NO: 20), BMX (SEQ ID NO: 46), RAB5A (SEQ ID NO: 24), UBAP1 (SEQ ID NO: 48), SOX2 (SEQ ID NO: 32), GPR157 (SEQ ID NO: 44), BDNF (SEQ ID NO: 18), ZMYM6 (SEQ ID NO: 42), SLC33A1 (SEQ ID NO: 12), TRIM32 (SEQ ID NO: 38), ALG10 (SEQ ID NO: 28), TFCP2 (SEQ ID NO: 50), SERPINH1 (SEQ ID NO: 52), SELL (SEQ ID NO: 56), ZNF510 (SEQ ID NO: 54), or antigenic fragments thereof, attached to the support.

In a third aspect, the present invention provides methods for detecting breast cancer, comprising;
  (a) contacting a suitable bodily fluid sample obtained from a subject at risk of breast cancer with one or more isolated polypeptides selected from the group consisting of ATP6AP1 (SEQ ID NO: 13), PDCD6IP (SEQ ID NO: 21), DBT (SEQ ID NO: 25), CSNK1E (SEQ ID NO: 9), FRS3 (SEQ ID NO: 3), RAC3 (SEQ ID NO: 15), HOXD1 (SEQ ID NO: 7), SF3A1 (SEQ ID NO: 1), CTBP1 (SEQ ID NO: 29), C15orf48 (SEQ ID NO: 35), MYOZ2 (SEQ ID NO: 33), EIF3E (SEQ ID NO: 39), BAT4 (SEQ ID NO: 5), ATF3 (SEQ ID NO: 19), BMX (SEQ ID NO: 45), RAB5A (SEQ ID NO: 23), UBAP1 (SEQ ID NO: 47), SOX2 (SEQ ID NO: 31), GPR157

(SEQ ID NO: 43), BDNF (SEQ ID NO: 17), ZMYM6 (SEQ ID NO: 41), SLC33A1 (SEQ ID NO: 11), TRIM32 (SEQ ID NO: 37), ALG10 (SEQ ID NO: 27), TFCP2 (SEQ ID NO: 49), SERPINH1 (SEQ ID NO: 51), SELL (SEQ ID NO: 55), ZNF510 (SEQ ID NO: 53), or antigenic fragments thereof; wherein the contacting occurs under conditions suitable for selective binding of antibodies in the bodily fluid sample to the one or more polypeptides; and
(b) detecting presence of antibodies to the polypeptides in the bodily fluid sample;
wherein the presence of antibodies to the one or more polypeptides indicates a likelihood of breast cancer in the subject.

DETAILED DESCRIPTION OF THE INVENTION

In a first aspect, the present invention provides polypeptide probe sets comprising:
(a) at least 2 different isolated polypeptides selected from the group consisting of ATP6AP1 (SEQ ID NO: 13), PDCD6IP (SEQ ID NO: 21), DBT (SEQ ID NO: 25), CSNK1E (SEQ ID NO: 9), FRS3 (SEQ ID NO: 3), RAC3 (SEQ ID NO: 15), HOXD1 (SEQ ID NO: 7), SF3A1 (SEQ ID NO: 1), CTBP1 (SEQ ID NO: 29), C15orf48 (SEQ ID NO: 35), MYOZ2 (SEQ ID NO: 33), EIF3E (SEQ ID NO: 39), BAT4 (SEQ ID NO: 5), ATF3 (SEQ ID NO: 19), BMX (SEQ ID NO: 45), RAB5A (SEQ ID NO: 23), UBAP1 (SEQ ID NO: 47), SOX2 (SEQ ID NO: 31), GPR157 (SEQ ID NO: 43), BDNF (SEQ ID NO: 17), ZMYM6 (SEQ ID NO: 41), SLC33A1 (SEQ ID NO: 11), TRIM32 (SEQ ID NO: 37), ALG10 (SEQ ID NO: 27), TFCP2 (SEQ ID NO: 49), SERPINH1 (SEQ ID NO: 51), SELL (SEQ ID NO: 55), ZNF510 (SEQ ID NO: 53), or antigenic fragments thereof, attached to the support.

Using a sequential screening strategy to select antigen-specific antibodies (AAb) from 4988 tumor antigens, 119 AAb potential novel biomarkers for the early detection of breast cancer were identified. A blinded validation study produced supporting evidence for 28 of these potential biomarkers, recited above. Thus, the polypeptide probe sets of the invention can be used, for example, to detect tumor antigen-specific autoantibodies in a bodily fluid sample from patients with breast cancer, such as early stage breast cancer. Descriptions of the polypeptides, their amino acid sequences and their nucleic acid sequences are provided in Table 1.

In various embodiments, the polypeptide probe sets comprise at least 2, 3, 4, 5, 6, 7, 8, 9, 10, 11, 12, 13, 14, 15, 16, 17, 18, 19, 20, 21, 22, 23, 24, 25, 26, 27, or all 28 of the recited polypeptides, or antigenic portions thereof.

In a preferred embodiment, the at least 2 different isolated polypeptides in the probe sets are selected from the group consisting of ATP6AP1 (SEQ ID NO: 13), PDCD6IP (SEQ ID NO: 21), DBT (SEQ ID NO: 25), CSNK1E (SEQ ID NO: 9), FRS3 (SEQ ID NO: 3), HOXD1 (SEQ ID NO: 7), SF3A1 (SEQ ID NO: 1), C15orf48 (SEQ ID NO: 35), MYOZ2 (SEQ ID NO: 33), BAT4 (SEQ ID NO: 5), BMX (SEQ ID NO: 45), RAB5A (SEQ ID NO: 23), UBAP1 (SEQ ID NO: 47), GPR157 (SEQ ID NO: 43), ZMYM6 (SEQ ID NO: 41), SLC33A1 (SEQ ID NO: 11), TRIM32 (SEQ ID NO: 37), ALG10 (SEQ ID NO: 27), TFCP2 (SEQ ID NO: 49), SERPINH1 (SEQ ID NO: 51), SELL (SEQ ID NO: 55), ZNF510 (SEQ ID NO: 53), or antigenic fragments thereof. Thus, in various embodiments, the polypeptide probe sets comprise at least 2, 3, 4, 5, 6, 7, 8, 9, 10, 11, 12, 13, 14, 15, 16, 17, 18, 19, 20, 21, or al122 of the recited polypeptides, or antigenic portions thereof. In a further preferred embodiment the probe sets comprise ATP6AP1 (SEQ ID NO: 13) and at least one other of the recited polypeptides, or antigenic portions thereof. Thus, in various embodiments, the polypeptide arrays comprise at least ATP6AP1 and 1, 2, 3, 4, 5, 6, 7, 8, 9, 10, 11, 12, 13, 14, 15, 16, 17, 18, 19, 20, 21, 22, 23, 24, 25, 26, or all 27 of the other recited polypeptides, or antigenic portions thereof.

In a preferred embodiment, the probe sets comprise at least 2, 3, 4, 5, or all 6 of ATP6AP1 (SEQ ID NO: 13), CTBP1 (SEQ ID NO: 29), EIF3E (SEQ ID NO: 39), ATF3 (SEQ ID NO: 19), SOX2 (SEQ ID NO: 31), and BDNF (SEQ ID NO: 17), or antigenic portions thereof. The term "polypeptide" is used in its broadest sense to refer to a polymer of subunit amino acids, amino acid analogs, or peptidomimetics, including proteins and peptoids. The polypeptides may be naturally occurring full length proteins or fragments thereof, processed forms of naturally occurring polypeptides (such as by enzymatic digestion), chemically synthesized polypeptides, or recombinantly expressed polypeptides. The polypeptides may comprise D- and/or L-amino acids, as well as any other synthetic amino acid subunit, and may contain any other type of suitable modification, including but not limited to peptidomimetic bonds and reduced peptide bonds.

As used herein, an "antigenic fragment" is any portion of at least 4 amino acids of the recited polypeptide that can give rise to an immune response. In various preferred embodiments, the antigenic fragments are at least 5, 6, 7, 8, 9, 10, 11, 12, 13, 14, 151, 16, 17, 18, 19, 20, 21, 22, 23, 24, 25, 26, 27, 28, 29, 30, 35, 40, 45, 50, 75, 100, 150, 200, 250, 300, or the full amino acid sequence of the recited polypeptide.

In various further preferred embodiments, that can be combined with any other embodiments, the polypeptide probe sets comprise no more than 20,000 different polypeptides, or antigenic portions thereof and preferably comprise no more than 10,000; 5,000; 1,000; 500; 250; 100; 75; 50; 45; 40; 35; 30; 28, 27, 26, 25, 24, 23, 22, 21, 20, 19, 18, 17, 16, 15, 14, 13, 12, 11, 10, 9, 8, 7, 6, 5, 4, 3, or 2 different polypeptides. In this and other embodiments, two or more antigenic portions of the same polypeptide in the probe set count only as 1 polypeptide or antigenic portion thereof.

As will be appreciated by those of skill in the art, it may be desirable to include further polypeptides or other molecules in the probe sets as references, controls, positional markers, or as additional markers. Any suitable such further polypeptide or other molecule can be used. Exemplary additional polypeptide markers include but are not limited to p53, CTBP1, RAC3, and activating transcription factor-3 (ATF3). Exemplary analytical controls include human IgG and empty spots (when the probe set is present on a support). Any portion or the entirety of the recited polypeptides may be used in the probe set, so long as it is capable of binding to autoantibodies against the polypeptide.

The polypeptide probe sets can be present in any form useful for a given purpose. In various preferred embodiments, they can be present in solution, lyophilized, frozen, or immobilized on a substrate.

In one preferred embodiment, the polypeptides are immobilized on a substrate. Any suitable technique for immobilizing the polypeptides on the support can be used. In one embodiment, Nucleic Acid Protein Programmable Array (NAPPA technology can be used. NAPPA arrays are generated by printing full-length cDNAs encoding the target proteins at each feature of the array. The proteins are then transcribed and translated by a cell-free system and immobilized in situ using epitope tags fused to the proteins. Other suitable immobilization methods include, but are not limited to luciferase immunoprecipitation systems (LIPS), Luminex™ beads, wells of a 96 well dish, standard immune dipstick assays, standard ELISA assays, As used herein, an array may be any arrangement or disposition of the polypeptides. In one embodiment, the polypeptides are at specific and identifiable locations on the array. Those of skill in the art will recognize that many such permutations of the polypeptides on the array are possible. In another non-limiting embodiment, each distinct location on the array comprises a distinct polypeptide.

Any suitable support may be used. Examples of such supports include, but are not limited to, microarrays, beads, columns, optical fibers, wipes, nitrocellulose, nylon, glass, quartz, diazotized membranes (paper or nylon), silicones, polyformaldehyde, cellulose, cellulose acetate, paper, ceramics, metals, metalloids, semiconductive materials, coated beads, magnetic particles; plastics such as polyethylene, polypropylene, and polystyrene; and gel-forming materials, such as proteins (e.g., gelatins), lipopolysaccharides, silicates, agarose, polyacrylamides, methylmethacrylate polymers; sol gels; porous polymer hydrogels; nanostructured surfaces; nanotubes (such as carbon nanotubes), and nanoparticles (such as gold nanoparticles or quantum dots).

In one embodiment, the support is a solid support. Any suitable "solid support" may be used to which the polypeptides can be attached including but not limited to dextrans, hydrogels, silicon, quartz, other piezoelectric materials such as langasite ($La_3Ga_5SiO_{14}$), nitrocellulose, nylon, glass, diazotized membranes (paper or nylon), polyformaldehyde, cellulose, cellulose acetate, paper, ceramics, metals, metalloids, semiconductive materials, coated beads, magnetic particles; plastics such as polyethylene, polypropylene, and polystyrene; and gel-forming materials, such as proteins (e.g., gelatins), lipopolysaccharides, silicates, agarose and polyacrylamides.

Any suitably sized solid support can be used. In one non-limiting example, the solid support comprises slides with dimensions of approximately 3 inches by 1 inch.

In all embodiments of the invention, the polypeptides of the probe set may further comprise a tag, such as a detectable moiety. This is particularly preferred when the polypeptide probe sets or in solution, or in any other format where different polypeptides in the probe set cannot be distinguished by differential positions on a support. In such embodiments, it is particularly preferred that the different polypeptides, or antigenic fragments thereof, that are present in the probe set are distinguishable, through the use of differentially detectable tags, using techniques known to those of skill in the art. The tag(s) can be linked to the polypeptide through covalent bonding, including, but not limited to, disulfide bonding, hydrogen bonding, electrostatic bonding, recombinant fusion and conformational bonding. Alternatively, the tag(s) can be linked to the polypeptide by means of one or more linking compounds. Techniques for conjugating tags to polypeptides are well known to the skilled artisan. The polypeptides of the probe set, comprising a detectable tag can be used diagnostically to, for example, assess the presence of antibodies to the polypeptides in a sample; and thereby detect the presence of breast cancer, or monitor the development or progression of breast cancer as part of a clinical testing procedure. Any suitable detection tag can be used, including but not limited to enzymes, prosthetic groups, fluorescent materials, luminescent materials, bioluminescent materials, radioactive materials, positron emitting metals, and nonradioactive paramagnetic metal ions. The tag used will depend on the specific detection/analysis/diagnosis techniques and/or methods used such as immunohistochemical staining of (tissue) samples, flow cytometric detection, scanning laser cytometric detection, fluorescent immunoassays, enzyme-linked immunosorbent assays (ELISAs), radioimmunoassays (RIAs), bioassays (e.g., neutralization assays), Western blotting applications, etc. For immunohistochemical staining of tissue samples preferred tags are enzymes that catalyze production and local deposition of a detectable product. Enzymes typically conjugated to polypeptides to permit their immunohistochemical visualization are well known and include, but are not limited to, acetylcholinesterase, alkaline phosphatase, beta-galactosidase, glucose oxidase, horseradish peroxidase, and urease. Typical substrates for production and deposition of visually detectable products are also well known to the skilled person in the art. The polypeptides can be labeled using colloidal gold or they can be labeled with radioisotopes, such as $^{33}P$, $^{32}P$, $^{35}S$, $^{3}H$, and $^{125}I$. Polypeptides of the probe set can be attached to radionuclides directly or indirectly via a chelating agent by methods well known in the art.

In a second aspect, the present invention provides polynucleotide arrays comprising:

(a) a support; and
(b) at least 2 different isolated nucleic acids encoding polypeptides selected from the group consisting of ATP6AP1 (SEQ ID NO: 14), PDCD6IP (SEQ ID NO: 22), DBT (SEQ ID NO: 26), CSNK1E (SEQ ID NO: 10), FRS3 (SEQ ID NO: 4), RAC3 (SEQ ID NO: 16), HOXD1 (SEQ ID NO: 8), SF3A1 (SEQ ID NO: 2), CTBP1 (SEQ ID NO: 30), C15orf48 (SEQ ID NO: 36), MYOZ2 (SEQ ID NO: 34), EIF3E (SEQ ID NO: 40), BAT4 (SEQ ID NO: 6), ATF3 (SEQ ID NO: 20), BMX (SEQ ID NO: 46), RAB5A (SEQ ID NO: 24), UBAP1 (SEQ ID NO: 48), SOX2 (SEQ ID NO: 32), GPR157 (SEQ ID NO: 44), BDNF (SEQ ID NO: 18), ZMYM6 (SEQ ID NO: 42), SLC33A1 (SEQ ID NO: 12), TRIM32 (SEQ ID NO: 38), ALG10 (SEQ ID NO: 28), TFCP2 (SEQ ID NO: 50), SERPINH1 (SEQ ID NO: 52), SELL (SEQ ID NO: 56), ZNF510 (SEQ ID NO: 54), or antigenic fragments thereof, attached to the support In this aspect, the arrays can also be used for example, to detect tumor antigen-specific autoantibodies in patients with breast cancer, such as early stage breast cancer. Any suitable technique can be used for attaching the nucleic acids to the support. In one embodiment, NAPPA arrays are generated by printing fcDNAs encoding the target proteins, or antigenic fragments thereof, at features of the support. Other techniques for printing nucleic acids on a support can be used and are well known in the art.

In various embodiments, the arrays comprise at least 2, 3, 4, 5, 6, 7, 8, 9, 10, 11, 12, 13, 14, 15, 16, 17, 18, 19, 20, 21, 22, 23, 24, 25, 26, 27, or all 28 of the recited nucleic acids, attached to the support.

In a preferred embodiment the at least 2 different isolated nucleic acids encode polypeptides selected from the group consisting of ATP6AP1 (SEQ ID NO: 14), PDCD6IP (SEQ ID NO: 22), DBT (SEQ ID NO: 26), CSNK1E (SEQ ID NO: 10), FRS3 (SEQ ID NO: 4), HOXD1 (SEQ ID NO: 8), SF3A1 (SEQ ID NO: 2), C15orf48 (SEQ ID NO: 36), MYOZ2 (SEQ ID NO: 34), BAT4 (SEQ ID NO: 6), BMX (SEQ ID NO: 46), RAB5A (SEQ ID NO: 24), UBAP1 (SEQ ID NO: 48), GPR157 (SEQ ID NO: 44), ZMYM6 (SEQ ID NO: 42), SLC33A1 (SEQ ID NO: 12), TRIM32 (SEQ ID NO: 38), ALG10 (SEQ ID NO: 28), TFCP2 (SEQ ID NO: 50), SERPINH1 (SEQ ID NO: 52), SELL (SEQ ID NO: 56), ZNF510 (SEQ ID NO: 54), or antigenic fragments thereof. Thus, in various embodiments, the polynucleotide arrays comprise at least 2, 3, 4, 5, 6, 7, 8, 9, 10, 11, 12, 13, 14, 15, 16, 17, 18, 19, 20, 21, or all 22 of the recited nucleic acids, or antigenic portions thereof, attached to the support.

In a further preferred embodiment the at least 2 different isolated nucleic acids encode ATP6AP1 (SEQ ID NO: 14) and at least one other of the recited nucleic acids, or antigenic portions thereof. Thus, in various embodiments, the polynucleotide arrays comprise at least ATP6AP1 and 1, 2, 3, 4, 5, 6, 7, 8, 9, 10, 11, 12, 13, 14, 15, 16, 17, 18, 19, 20, 21, 22, 23, 24, 25, 26, or all 27 of the other recited nucleic acids, or antigenic portions thereof, attached to the support.

In another preferred embodiment, the at least isolated nucleic acids encode 2, 3, 4, 5, or all 6 of ATP6AP1 (SEQ ID NO: 13), CTBP1 (SEQ ID NO: 29), EIF3E (SEQ ID NO: 39), ATF3 (SEQ ID NO: 19), SOX2 (SEQ ID NO: 31), and BDNF (SEQ ID NO: 17), or antigenic portions thereof.

In various further preferred embodiments, that can be combined with any other embodiments, the arrays comprise no more than 20,000 different nucleic acids, and preferably comprise no more than 10,000; 5,000; 1,000; 500; 250; 100; 75; 50; 45; 40; 35; 30; 28, 27, 26, 25, 24, 23, 22, 21, 20, 19, 18, 17, 16, 15, 14, 13, 12, 11, 10, 9, 8, 7, 6, 5, 4, 3, or 2 different nucleic acids.

As will be appreciated by those of skill in the art, it may be desirable to place nucleic acids encoding other polypeptides on the support as controls, positional markers, or as additional markers, including but not limited to p53, CTBP1, RAC3, and activating transcription factor-3 (ATF3).

Any portion or the entirety of the recited nucleic acid may be attached to the support, so long as it is encodes a polypeptide, or antigenic fragment thereof, capable of binding to autoantibodies against the polypeptide.

The definitions and all embodiments disclosed in the first aspect apply to this second aspect.

In a third aspect, the present invention provides methods for detecting breast cancer, comprising;
(a) contacting a suitable bodily fluid sample obtained from a subject at risk of breast cancer with one or more isolated polypeptides selected from the group consisting of ATP6AP1 (SEQ ID NO: 13), PDCD6IP (SEQ ID NO: 21), DBT (SEQ ID NO: 25), CSNK1E (SEQ ID NO: 9), FRS3 (SEQ ID NO: 3), RAC3 (SEQ ID NO: 15), HOXD1 (SEQ ID NO: 7), SF3A1 (SEQ ID NO: 1), CTBP1 (SEQ ID NO: 29), C15orf48 (SEQ ID NO: 35), MYOZ2 (SEQ ID NO: 33), EIF3E (SEQ ID NO: 39), BAT4 (SEQ ID NO: 5), ATF3 (SEQ ID NO: 19), BMX (SEQ ID NO: 45), RAB5A (SEQ ID NO: 23), UBAP1 (SEQ ID NO: 47), SOX2 (SEQ ID NO: 31), GPR157 (SEQ ID NO: 43), BDNF (SEQ ID NO: 17), ZMYM6 (SEQ ID NO: 41), SLC33A1 (SEQ ID NO: 11), TRIM32 (SEQ ID NO: 37), ALG10 (SEQ ID NO: 27), TFCP2 (SEQ ID NO: 49), SERPINH1 (SEQ ID NO: 51), SELL (SEQ ID NO: 55), ZNF510 (SEQ ID NO: 53), or antigenic fragments thereof; wherein the contacting occurs under conditions suitable for selective binding of antibodies in the bodily fluid sample to the one or more polypeptides; and
(b) detecting presence of antibodies to the polypeptides in the bodily fluid sample;
wherein the presence of antibodies in the bodily fluid sample to the one or more polypeptides indicates a likelihood of breast cancer in the subject.

The inventors have discovered that the presence of autoantibodies to one or more of the recited polypeptides is a positive predictor of breast cancer, and thus the methods of the invention provide valuable diagnostic and prognostic information to an attending physician.

As used herein a subject "at risk of breast cancer" is any human considered to be in a risk group for breast cancer. In one embodiment, the subject is a woman. In other embodiments, the subject has one or more of a lump in their breast tissue, lymph nodes, or armpit; changes in breast size or shape; skin dimpling; nipple inversion; spontaneous single-nipple discharge; a family/personal history of breast cancer; or is a carrier of a mutation in the BRCA or other gene that predisposes one to breast cancer.

Suitable bodily fluid samples include serum, plasma, CSF, pleural fluid, joint fluid, nipple discharge, saliva. In a preferred embodiment, the bodily fluid sample is serum or plasma.

In one embodiment, the presence of any amount of antibodies to the polypeptides in a sample from a subject at risk of breast cancer can indicate a likelihood of breast cancer in the subject. In another embodiment, if antibodies to the polypeptides are present in a sample from a subject at risk of breast cancer, at levels which are higher than that of a control sample (i.e. a sample from a subject who does not have breast cancer) than the subject at risk of breast cancer has a likelihood of breast cancer. Subjects with a likelihood of breast cancer can then be tested for the actual presence of breast cancer using standard diagnostic techniques known to the skilled artisan, including mammography, biopsy, or breast MRI. In various embodiments, the method results in an accurate diagnosis in at least 70% of cases; more preferably of at least 75%, 80%, 85%, 90%, or more of the cases. In a preferred embodiment, the likelihood of breast cancer is a likelihood of Stage I or Stage II breast cancer.

In various embodiments, the methods comprise contacting a bodily fluid sample, such as serum, obtained from a subject at risk of breast cancer with 2, 3, 4, 5, 6, 7, 8, 9, 10, 11, 12, 13, 14, 15, 16, 17, 18, 19, 20, 21, 22, 23, 24, 25, 26, 27, or all 28 of the recited polypeptides, or antigenic fragments thereof. In various embodiments, the presence of antibodies in the bodily fluid sample to 1, 2, 3, 4, 5, 6, 7, 8, 9, 10, 11, 12, 13, 14, 15, 16, 17, 18, 19, 20, 21, 22, 23, 24, 25, 26, 27, or all 28 of the recited polypeptides, or antigenic fragments thereof, indicates a likelihood of breast cancer in the subject.

In a preferred embodiment, the one or more isolated polypeptides are selected from the group consisting of ATP6AP1 (SEQ ID NO: 13), PDCD6IP (SEQ ID NO: 21), DBT (SEQ ID NO: 25), CSNK1E (SEQ ID NO: 9), FRS3 (SEQ ID NO: 3), HOXD1 (SEQ ID NO: 7), SF3A1 (SEQ ID NO: 1), C15orf48 (SEQ ID NO: 35), MYOZ2 (SEQ ID NO: 33), BAT4 (SEQ ID NO: 5), BMX (SEQ ID NO: 45), RAB5A (SEQ ID NO: 23), UBAP1 (SEQ ID NO: 47), GPR157 (SEQ ID NO: 43), ZMYM6 (SEQ ID NO: 41), SLC33A1 (SEQ ID NO: 11), TRIM32 (SEQ ID NO: 37), ALG10 (SEQ TD NO: 27), TFCP2 (SEQ TD NO: 49), SERPINH1 (SEQ TD NO: 51), SELL (SEQ ID NO: 55), ZNF510 (SEQ ID NO: 53), or antigenic fragments thereof. Thus, in various embodiments, the methods comprise contacting a serum sample obtained from a subject at risk of breast cancer with 2, 3, 4, 5, 6, 7, 8, 9, 10, 11, 12, 13, 14, 15, 16, 17, 18, 19, 20, 21, or all 22 of the recited polypeptides, or antigenic fragments thereof.

In a further preferred embodiment, the methods comprise contacting a bodily fluid sample, such as a serum sample, obtained from a subject at risk of breast cancer with ATP6AP1 (SEQ ID NO: 13), or an antigenic fragment thereof. In this embodiment, the method may further comprise contacting the serum sample with 1, 2, 3, 4, 5, 6, 7, 8, 9, 10, 11, 12, 13, 14, 15, 16, 17, 18, 19, 20, 21, 22, 23, 24, 25, 26, or all 27 of the other recited polypeptides, or antigenic portions thereof.

In a preferred embodiment, the methods comprise contacting a bodily fluid sample, such as a serum sample, obtained from a subject at risk of breast cancer with 2, 3, 4, 5, or all 6 of ATP6AP1 (SEQ ID NO: 13), CTBP1 (SEQ ID NO: 29), EIF3E (SEQ ID NO: 39), ATF3 (SEQ ID NO: 19), SOX2 (SEQ ID NO: 31), and BDNF (SEQ ID NO: 17), or antigenic portions thereof.

In one preferred embodiment, the method comprises contacting the bodily fluid sample, such as a serum sample, to a polypeptide array of any embodiment of the first aspect of the invention, or to an array according to any embodiment of the second aspect of the invention after the encoded proteins are then transcribed and translated by a cell-free system and immobilized in situ using epitope tags fused to the proteins.

As will be appreciated by those of skill in the art, it may be desirable to test for autoantibodies to other polypeptides, and so the method may comprise testing for such further autoantibodies, such as antibodies to p53, CTBP1, RAC3, and activating transcription factor-3 (ATF3).

The "binding" may comprise any detectable interaction of an antibody with an antigen (polypeptide or polynucleotide molecule), including without limitation a covalent bond, ionic bond, salt bridge, hydrogen bond, van der Waals interaction, hydrophobic/hydrophilic interaction, electrostatic interaction, steric interaction, other associations, or any combination of any of the foregoing. As will be understood by those of skill in the art, array interactions do not require chemical binding.

In one embodiment, a probe set, such as an array according to any embodiment of the invention are contacted with the bodily fluid, such as a serum sample, under conditions suitable for binding of antibodies in the fluid to antigens in the probe set; unbound antibodies are washed and bound antibodies are detected by labeled secondary reagents, such as labeled secondary antibodies. Suitable conditions and reagents to promote binding of specific antibody types to antigens (polypeptides or polynucleotides molecules) is well within the level of those of skill in the art. Thus, the methods of the invention are not limited by any specific type of binding conditions employed. Such conditions will vary depending on the type of sample, desired stringency of the binding interaction, and nature of the competing materials in the binding solution, the type of molecules (polypeptide or polynucleotide) in the probe set, the type of probe set, and, for embodiments in which the probe set is present on a support, the type of support, and the density of the molecules arrayed on the support. In a preferred embodiment, the conditions comprise a step to remove unbound antibodies. Determining the need for such a step, and appropriate conditions for such a step, are well within the level of skill in the art.

Any type of labeled secondary reagents label can be used in the methods of the present invention, including but not limited to radioisotope labels, fluorescent labels, luminescent labels, and electrochemical labels (i.e.: antibody labels with different electrode mid-point potential, where detection comprises detecting electric potential of the label). In a preferred embodiment, fluorescent or electrochemical labels are used. Detection of signal from detectable labels is well within the level of skill in the art. For example, fluorescent array readers are well known in the art, as are instruments to record electric potentials on a substrate (For electrochemical detection see, for example, J. Wang (2000) *Analytical Electrochemistry*, Vol., 2nd ed., Wiley-VCH, New York). In a further embodiment, the detectable labels comprise quantum dots. In one embodiment, secondary labels can be used, including but not limited to secondary antibodies or ligands that bind to the antibodies. In embodiments where multiple polypeptides are used as probes, it is preferable that they are differentially distinguishable, as discussed above. In a further embodiment, antibodies bound to each polypeptide are quantified by staining with anti-fusion tag antibodies and measurement of the fluorescence intensity signal generated from secondary antibodies. Detecting presence of antibodies to the polypeptides in the bodily fluid sample can be accomplished by standard methods in the art. Suitable conditions and reagents will be understood by those of skill in the art based on the teachings herein. The presence of antibodies to the polypeptides may be determined by immunoassay methods utilizing the antibodies described above. Such immunoassay methods include, but are not limited to, direct or indirect immunoassay such as for example a competitive binding assay, a non-competitive binding assay, a radioimmunoassay, immunohistochemistry, an enzyme-linked immunosorbent assay (ELISA), a sandwich assay, a gel diffusion immunodiffusion assay, an agglutination assay, dot blotting, a fluorescent immunoassay such as fluorescence-activated cell sorting (FACS), chemiluminescence immunoassay, immunoPCR immunoassay, a protein A or protein G immunoassay, and an immunoelectrophoresis assay such as western blotting and others commonly used and widely described in scientific and patent literature, and many employed commercially.

In the case of an enzyme immunoassay, an enzyme is conjugated to the second antibody, usually by means of glutaraldehyde or periodate. As will be readily recognized, however, a wide variety of different ligation techniques exist which are well-known to the skilled artisan. Commonly used enzymes include horseradish peroxidase, glucose oxidase, beta-galactosidase and alkaline phosphatase, among others. The substrates to be used with the specific enzymes are generally chosen for the production, upon hydrolysis by the corresponding enzyme, of a detectable color change. For example, p-nitrophenyl phosphate is suitable for use with alkaline phosphatase conjugates; for peroxidase conjugates, 1,2-phenylenediamine or toluidine are commonly used. It is also possible to employ fluorogenic substrates, which yield a fluorescent product, rather than the chromogenic substrates noted above. A solution containing the appropriate substrate is then added to the tertiary complex. The substrate reacts with the enzyme linked to the second antibody, giving a qualitative visual signal, which may be further quantitated, usually spectrophotometrically, to give an evaluation of the amount of secreted protein or fragment thereof. Alternately, fluorescent compounds, such as fluorescein and rhodamine, may be chemically coupled to antibodies without altering their binding capacity. When activated by illumination with light of a particular wavelength, the fluorochrome-labeled antibody absorbs the light energy, inducing a state of excitability in the molecule, followed by emission of the light at a characteristic longer wavelength. The emission appears as a characteristic color visually detectable with a light microscope. Immunofluorescence and EIA techniques are both very well established in the art and are particularly preferred for the present method. However, other reporter molecules, such as radioisotopes, chemiluminescent or bioluminescent molecules may also be employed.

In a further embodiment, the presence of antibodies to the polypeptides may be determined by using Western blot analysis. The technique generally comprises separating sample antibody proteins by gel electrophoresis on the basis of molecular weight and transferring the antibody proteins to a suitable solid support, such as nitrocellulose filter, a nylon filter, or derivatized nylon filter. The sample is incubated with the polypeptides or antigenic fragments thereof that specifically bind the sample antibodies and the resulting complex is detected. The polypeptides may be directly labeled or alternatively may be subsequently detected using labeled secondary antibodies that specifically bind to the polypeptide-antibody complex. Antibody binding reagents may be, for example, protein A, or other antibodies. Antibody binding reagents may be radiolabeled or enzyme linked. Detection may be by autoradiography, calorimetric reaction or chemiluminescence. This method allows both quantitation of an amount of sample antibody and determination of its identity by a relative position on the membrane which is indicative of a migration distance in the acrylamide gel during electrophoresis. The definitions and all embodiments disclosed in the first and second aspects apply to this third aspect.

EXAMPLES

Custom NAPPA protein microarrays were used to detect tumor antigen-specific AAb in the sera of patients with early-stage breast cancer. Using a sequential screening strategy to select AAb from 4988 tumor antigens, we identified 119 AAb potential biomarkers for the early detection of breast cancer. A blinded validation study produced supporting evidence for 28 of these potential biomarkers.

Sera used in these analyses were obtained from Fox Chase Cancer Center (FCCC) and the Duke University Medical Center (DUMC) with support from the NCI Early Detection Research Network and the NCI Breast SPORE program. Sera were derived from early-stage breast cancer patients from FCCC (53 cases/53 controls); control sera were sex- and age-matched (+/−2 yrs). All samples were obtained at the time of routine mammography, prior to the diagnosis of cancer, and were selected retrospectively. To control for benign breast disease, we obtained an independent set of sera of early-stage invasive breast cancer patients and age-matched (+/−3 yrs) benign breast disease controls from DUMC (102 cases/102 controls). These samples were collected using a standardized sample collection protocol and stored at −80° C. until use. Cases and matched controls were processed simultaneously. Written consent was obtained from all subjects under institutional review board approval.

Sequence-verified, full-length cDNA expression plasmids in flexible donor vector systems were obtained from the Harvard Institute of Proteomics and are publicly available (see web site dnasu.asu.edu/DNASU/). These were converted to the T7-based mammalian expression vector pANT7_GST using LR recombinase (Invitrogen, Carlsbad, CA). Expression plasmids were transformed into E. coli DH5α, and grown in 1.5 mL terrific broth and ampicillin (100 μg/mL). DNA was purified with the NucleoPrepII anion exchange resin (Macherey-Nagel Inc., Bethlehem, PA) using a Biomek FX (Beckman Coulter, Inc., Fullerton, CA) automated laboratory workstation. Automated addition of all solutions was accomplished using a Matrix Well-Mate™ (Thermo Scientific, Hudson, NH) rapid bulk liquid-dispensing instrument. Purified DNA was precipitated by addition of 0.6 volumes isopropanol, followed by centrifugation at 5000 rcf for 30 minutes. The DNA pellet was washed with 200 μL of 80% ethanol, centrifuged at 5000 ref for 15 minutes, dried, and resuspended in $dH_2O$. For bead array ELISAs, larger quantities of DNA were prepared using standard Nucleobond™ preparation methods (Macherey-Nagel Inc., Bethlehem, PA).

Plasmid DNA (1.5 μg/μL) was supplemented with capture antibody (50 μg/mL, anti-GST antibody, GE Healthcare Biosciences, Piscataway, NJ) or anti-FLAG antibody (Sigma-Aldrich, St. Louis, MO), protein crosslinker (2 mM, BS3, Pierce, Rockford, IL) and BSA (3 mg/mL, Sigma-Aldrich) to the DNA prior to printing onto the array surface. All samples were printed using a Genetix QArray2™ with 300 μm solid tungsten pins on amine-treated glass slides. Arrays were stored in an air-tight container at room temperature, protected from light. The printed DNA was transcribed and translated in situ using previously published protocols. Protein expression was detected using anti-GST MAb (Cell Signaling, Danvers, MA) diluted at 1:200. For detecting scrum antibodies, the arrays were incubated with scrum diluted 1:300-1:600 in 5% PBS milk with 0.2% Tween 20. All incubations were carried out at 4° C. overnight with mixing (Corning hybridization chambers) unless indicated otherwise. Detection on the array was carried out using an anti-human IgG (Jackson ImmunoResearch Labs, West Grove, PA) conjugated with HRP. The slides were developed for fluorescent detection using the Tyramide Signal Amplification reagent (PerkinElmer, Waltham, MA) per manufacturer's instructions. Slides were scanned with a Perkin Elmer ProScanArray HT and the images were quantitated using MicroVigene software (Vigene Tech version 2.9.9.2). The highly immunogenic EBV-derived antigen, EBNA-1, was included as N- and C-terminal fragments for positive control antigens. Negative controls included empty vectors and no DNA controls. Registration spots for array alignment were printed purified human IgG proteins.

For the first screening stage, 53 cases and 53 control sera from FCCC were screened on 4,988 antigens displayed in NAPPA protein array format. Each array was normalized by first removing the background signal estimated by the first quartile of the non-spots and then log-transforming the median-scaled raw intensities to bring the data to the same scale and stabilize the variance across the range of signals. Candidate antigens from the initial 4,988 antigens were selected if they met two different criteria: 1) comparison of the $95^{th}$ percentiles of the cases and controls using quantile regression and 2) comparison of the proportion of cases with intensities above the $95^{th}$ percentile of controls to the expected number seen by chance, with a p-value ≤0.05 (n=217). Additional antigens (n=544) were ranked based on intensity and decreasing specificity (cases/controls). Independent arrays of these 761 candidate antigens were screened with a fully independent set of age-matched sera consisting of 76 controls with benign breast disease and 102 patient sera from DUMC, randomly divided into training and validation sets. We normalized these arrays as follows. First, we removed differences in intensity associated with plates and pins by consecutively multiplying the raw intensities by three factors: the median intensity of all antigens divided by the median intensity of antigens from the same plate, the median intensity of all antigens divided by the median intensity of antigens printed at the same within-pin position, and the median intensity of all antigens divided by the median intensity of antigens printed with the same pin. These scalings yielded a median reduction in variance of 9%. We removed any duplicate antigen pairs that differed by more than 3 times the median absolute deviation, resulting in removal of 0.5% of spots. Third, we resealed the raw intensities as above and averaged duplicate antigen pairs. Finally, we removed background signal by subtracting the first quartile of control spot (no DNA) intensity and divided the excess intensity by the median excess intensity.

We used the partial area under the receiver operating characteristic curve (pAUC) as the basis for comparing the normalized intensities of cases and controls for each antigen. Specifically, we used the pAUC where the false positive rate is at most 5%. For each antigen we tested the hypothesis that the pAUC was greater than 0.00125, which is the same partial area under the 45 degree line receiver operating characteristic curve that represents no difference between cases and controls. We used the training set to identify 119 potential antigen biomarkers with p-values less than 0.05 and confirmed 28 of these using the validation set (p<0.05). Training and validation statistics for the 28 breast cancer biomarkers is provided in Table 1.

TABLE 1

| Gene Name | Accession number | Amino acid | Nucleotide |
|---|---|---|---|
| SF3A1 splicing factor 3A subunit 1 isoform 1-full length (1-793) | NP_005868 | SEQ ID NO: 1 | SEQ ID NO: 2 |
| FRS3 fibroblast growth factor receptor substrate 3-full length (1-492) | NP_006644 | SEQ ID NO: 3 | SEQ ID NO: 4 |
| BAT4 HLA-B associated transcript-4-full length (1-356) | NP_149417 | SEQ ID NO: 5 | SEQ ID NO: 6 |
| HOXD1 homeobox protein Hox-D1 full length (1-328) | AAH14477 | SEQ ID NO: 7 | SEQ ID NO: 8 |
| CSNK1E casein kinase I isoform epsilon full length (1-416) | NP_001885 | SEQ ID NO: 9 | SEQ ID NO: 10 |
| SLC33A1 acetyl-coenzyme A transporter 1-full length (1-549) | NP_004724 | SEQ ID NO: 11 | SEQ ID NO: 12 |
| ATP6AP1 V-type proton ATPase subunit S1 precursor-full length (1-470) | NP_001174 | SEQ ID NO: 13 | SEQ ID NO: 14 |
| RAC3 ras-related C3 botulinum toxin substrate 3 precursor-full length (1-192) | NP_005043 | SEQ ID NO: 15 | SEQ ID NO: 16 |
| BDNF brain-derived neurotrophic factor transcript variant 5-full length (1-247) | AAA96140 | SEQ ID NO: 17 | SEQ ID NO: 18 |
| ATF3 cyclic AMP-dependent transcription factor ATF-3 isoform 1-full length (1-181) | NP_001665 | SEQ ID NO: 19 | SEQ ID NO: 20 |
| PDCD6IP programmed cell death 6-interacting protein isoform 1-full length (1-868) | NP_037506 | SEQ ID NO: 21 | SEQ ID NO: 22 |
| RAB5A ras-related protein Rab-5A-full length (1-215) | NP_004153 | SEQ ID NO: 23 | SEQ ID NO: 24 |
| DBT Dihydrolipoamide branched chain transacylase E2-full length (1-482) | AAH16675 | SEQ ID NO: 25 | SEQ ID NO: 26 |
| ALG10 alpha-1,2-glucosyltransferase ALG10-A-full length (1-473) | NP_116223 | SEQ ID NO: 27 | SEQ ID NO: 28 |
| CTBP1 C-terminal-binding protein 1 isoform 1-full length (1-440) | NP_001319 | SEQ ID NO: 29 | SEQ ID NO: 30 |
| SOX2 transcription factor SOX-2-full length (1-317) | NP_003097 | SEQ ID NO: 31 | SEQ ID NO: 32 |
| MYOZ2 myozenin-2-full length (1-264) | NP_057683 | SEQ ID NO: 33 | SEQ ID NO: 34 |
| C15orf48 normal mucosa of esophagus-specific gene 1 protein-full length (1-83) | NP_115789 | SEQ ID NO: 35 | SEQ ID NO: 36 |
| TRIM32 E3 ubiquitin-protein ligase TRIM32-full length (1-653) | NP_001093149 | SEQ ID NO: 37 | SEQ ID NO: 38 |
| EIF3E eukaryotic translation initiation factor 3 subunit E-full length (1-445) | NP_001559 | SEQ ID NO: 39 | SEQ ID NO: 40 |
| ZMYM6 zinc finger, MYM-type 6, isoform CRA_b-partial (1-156/163) | AAP35781 | SEQ ID NO: 41 | SEQ ID NO: 42 |
| GPR157 probable G-protein coupled receptor 157-partial (1-155/335) | EAW71612 | SEQ ID NO: 43 | SEQ ID NO: 44 |
| BMX cytoplasmic tyrosine-protein kinase BMX-full length (1-675) | NP_001712 | SEQ ID NO: 45 | SEQ ID NO: 46 |
| UBAP1 ubiquitin-associated protein 1 isoform 1-full length (1-502) | NP_057609 | SEQ ID NO: 47 | SEQ ID NO: 48 |
| TFCP2 grainyhead-like 3 (Drosophila), isoform CRA_d-full length (1-555) | AAH36890 | SEQ ID NO: 49 | SEQ ID NO: 50 |
| SERPINH1 serpin H1 precursor-full length (1-418) | NP_001226 | SEQ ID NO: 51 | SEQ ID NO: 52 |
| ZNF510 zinc finger protein 510-partial (1-636/683) | AAH68587 | SEQ ID NO: 53 | SEQ ID NO: 54 |
| SELL L-selectin precursor-full length (1-375) | AAH20758 | SEQ ID NO: 55 | SEQ ID NO: 56 |

We claim:

1. A polynucleotide array comprising:
   (a) a support; and
   (b) at least 2 different isolated nucleic acids encoding polypeptides selected from the group consisting of ATP6AP1 (SEQ ID NO: 14), PDCD6IP (SEQ ID NO: 22), DBT (SEQ ID NO: 26), CSNKIE (SEQ ID NO: 10), FRS3 (SEQ ID NO: 4), HOXD1 (SEQ ID NO: 8), SF3A1 (SEQ ID NO: 2), C15orf48 (SEQ ID NO: 36), MYOZ2 (SEQ ID NO: 34), BAT4 (SEQ ID NO: 6), BMX (SEQ ID NO: 46), RAB5A (SEQ ID NO: 24), UBAP1 (SEQ ID NO: 48), GPR157 (SEQ ID NO: 44), ZMYM6 (SEQ ID NO: 42), SLC33A1 (SEQ ID NO: 12), TRIM32 (SEQ ID NO: 38), ALG10 (SEQ ID NO: 28), TFCP2 (SEQ ID NO: 50), SERPINH1 (SEQ ID NO: 52), SELL (SEQ ID NO: 56), ZNF510 (SEQ ID NO: 54), or antigenic fragments thereof, attached to the support wherein the array comprise no more than 100 different isolated nucleic acids;
   wherein the polynucleotide array is a Nucleic Acid Protein Programmable Array.

2. The polynucleotide array of claim 1, wherein at least 1 of the at least 2 different isolated nucleic acids encodes ATP6AP1 (SEQ ID NO: 14), or an antigenic fragment thereof.

3. The polynucleotide array of claim 1, wherein the array comprise no more than 50 different isolated nucleic acids.

4. The polynucleotide array of claim 1, wherein the array comprise no more than 25 different isolated nucleic acids.

* * * * *

SEQUENCE LISTING

```
Sequence total quantity: 56
SEQ ID NO: 1          moltype = AA   length = 793
FEATURE               Location/Qualifiers
source                1..793
                      mol_type = protein
                      organism = Homo sapiens
SEQUENCE: 1
MPAGPVQAVP PPPPVPTEPK QPTEEEASSK EDSAPSKPVV GIIYPPPEVR NIVDKTASFV    60
ARNGPEFEAR IRQNEINNPK FNFLNPNDPY HAYYRHKVSE FKEGKAQEPS AAIPKVMQQQ   120
QQTTQQQLPQ KVQAQVIQET IVPKEPPPEF EFIADPPSIS AFDLDVVKLT AQFVARNGRQ   180
FLTQLMQKEQ RNYQFDFLRP QHSLFNYFTK LVEQYTKILI PPKGLFSKLK KEAENPREVL   240
DQVCYRVEWA KFQERERKKE EEEKEKERVA YAQIDWHDFV VVETVDFQPN EQGNFPPPTT   300
PEELGARILI QERYEKFGES EEVEMEVESD EEDDKQEKAE EPPSQLDQDT QVQDMDEGSD   360
DEEEGQKVPP PPETPMPPPL PPTPDQVIVR KDYDPKASKP LPPAPAPDEY LVSPITGEKI   420
PASKMQEHMR IGLLDPRWLE QRDRSIREKQ SDDEVYAPGL DIESSLKQLA ERRTDIFGVE   480
ETAIGKKIGE EEIQKPEEKV TWDGHSGSMA RTQQAAQANI TLQEQIEAIH KAKGLVPEDD   540
TKEKIGPSKP NEIPQQPPPP SSATNIPSSA PPITSVPRPP TMPPPVRTTV VSAVPVMPRP   600
PMASVVRLPP GSVIAPMPPI IHAPRINVVP MPPSAPPIMA PRPPPMIVPT AFVPAPPVAP   660
VPAPAPMPPV HPPPPMEDEP TSKKLKTEDS LMPEEEFLRR NKGPVSIKVQ VPNMQDKTEW   720
KLNGQVLVFT LPLTDQVSVI KVKIHEATGM PAGKQKLQYE GIFIKDSNSL AYYNMANGAV   780
IHLALKERGG RKK                                                     793

SEQ ID NO: 2          moltype = DNA   length = 2379
FEATURE               Location/Qualifiers
source                1..2379
                      mol_type = unassigned DNA
                      organism = Homo sapiens
SEQUENCE: 2
atgccggccg acccgtgca ggcggtgccc ccgccgccgc cgtgcccac ggagcccaaa      60
cagcccacag aagaagaagc atcttcaaag gaggattctg caccttctaa gccagttgtg   120
gggattattt accctcctcc agaggtcaga aatattgttg acaagactgc agctttgtg    180
gccagaaacg ggcctgaatt tgaagctagg atccgacaga acgagatcaa caaccccaag   240
ttcaactttc tgaaccccaa tgacccttac catgcctact accgccacaa ggtcagcgag   300
ttcaaggaag gaaggctca ggagccgtcc gccgccatcc ccaaggtcat gcagcagcag    360
cagcagacca cccagcagca gctgccccag aaggtccaag cccaagtaat ccaagagacc   420
atcgtgccca aagagcctcc tcctgagttt gagttcattg ctgatcctcc ctctatctca   480
gccttcgact tggatgtggt gaagctgacg gctcagtttg tggccaggaa tgggcgccag   540
tttctgaccc agctgatgca gaaagagcag cgcaactacc agtttgactt ctcccgccca   600
cagcacagcc tcttcaacta cttcacgaag ctagtggaac agtacaccaa gatcttgatt   660
ccacccaaag gtttatttc aaagctcaag aaagaggctg aaaacccccg agaagttttg    720
gatcaggtgt gttaccgagt ggaatgggcc aaattccagg aacgtgagag gaagaaggaa   780
gaagaggaga aggagaagga gcgggtggcc tatgctcaga tcgactggca tgattttgtg   840
gtggtggaaa cagtggactt ccaacccaat gagcaaggga acttccctcc ccccaccacg   900
ccagaggagc tggggccg aatcctcatt caggagcgct atgaaaagtt tggggagagt      960
gaggaagttg agatggaggt cgagtctgat gaggaggatg acaaacagga gaaggcggag   1020
gagcctcctt cccagctgga ccaggacacc caagtacaag atatggatga gggttcagat   1080
gatgaagaag aagggcagaa agtgcccca ccccagaga cacccatgcc tccacctctg     1140
ccccaactc cagaccaagt cattgtccgc aaggattatg atcccaaagc ctccaagccc    1200
ttgcctccag cccctgctcc agatgagtat cttgtgtccc ccattactgg ggagaagatc   1260
cccgccagca aaatgcagga acacatgcgc attggactc ttgaccctcg ctggctggag     1320
cagcgggatc gctccatccg tgagaagcag agcgatgatg aggtgtacgc accaggtctg   1380
gatattgaga gcagcttgaa gcagttggct gagcggcgta ctgacatctt cggtgtagag   1440
gaaacagcca ttggtaagaa gatcggtgag gaggagatcc agaagccaga ggaaaaggtg   1500
acctgggatg gccactcagg cagcatggcc cggacccagc aggctgccca ggccaacatc   1560
accctccagg agcagattga ggccattcac aaggccaaag gctggtgcc agaggatgac     1620
actaaagaga agattggccc cagcaagccc aatgaaatcc ctcaacagcc accgccacca   1680
tcttcagcca ccaacatccc cagctcggct ccacccatca cttcagtgcc ccgaccacct   1740
acaatgccac ctccagttcg tactacagtt gtcccgcag tacccgtcat gccccggccc    1800
ccaatggcat ctgtggtccg gctgccccca ggctcagtga tcgcccccat gccgcccatc   1860
atccacgcgc ccagaatcaa cgtggtgccc atgcctccct cggcccctcc tattatggcc   1920
ccccgcccac ccccatgat tgtgccaaca gcctttgtgc ctgctcccac tgtggcacct     1980
gtcccagctc cagccccaat gccccctgtg catccccac ctcccatgga agatgagccc     2040
acctccaaaa aactgaagac agaggacagc ctcatgccag aggaggagtt cctgcgcaga   2100
aacaagggtc cagtgtccat caagtccag gtgcccaaca tgcaggataa gacggaatgg     2160
aaactgaatg ggcaggtgct ggtcttcacc ctcccactca cggaccagt ctctgtcatt      2220
aaggtgaaga ttcatgaagc cacaggcatg cctgcaggga aacagaagct acagtatgag   2280
ggtatcttca tcaaagattc caactcactg gcttactaca acatggccaa tggcgcagtc   2340
atccacctgg ccctcaagga gagaggcggg aggaagaag                          2379

SEQ ID NO: 3          moltype = AA   length = 492
FEATURE               Location/Qualifiers
source                1..492
                      mol_type = protein
                      organism = Homo sapiens
SEQUENCE: 3
MGSCCSCLNR DSVPDNHPTK FKVTNVDDEG VELGSGVMEL TQSELVLHLH RREAVRWPYL    60
CLRRYGYDSN LFSFESGRRC QTGQGIFAFK CSRAEEIFNL LQDLMQCNSI NVMEEPVIIT   120
RNSHPAELDL PRAPQPPNAL GYTVSSFSNG CPGEGPRFSA PRRLSTSSLR HPSLGEESTH   180
```

```
ALIAPDEQSH TYVNTPASED DHRRGRHCLQ PLPEGQAPFL PQARGPDQRD PQVFLQPGQV   240
KFVLGPTPAR RHMVKCQGLC PSLHDPPHHN NNNEAPSECP AQPKCTYENV TGGLWRGAGW   300
RLSPEEPGWN GLAHRRAALL HYENLPPLPP VWESQAQQLG GEAGDDGDSR DGLTPSSNGF   360
PDGEEEDETPL QKPTSTRAAI RSHGSFPVPL TRRRGSPRVF NFDFRRPGPE PPRQLNYIQV   420
ELKGWGGDRP KGPQNPSSPQ APMPTTHPAR SSDSYAVIDL KKTVAMSNLQ RALPRDDGTA   480
RKTRHNSTDL PL                                                      492

SEQ ID NO: 4            moltype = DNA   length = 1476
FEATURE                 Location/Qualifiers
source                  1..1476
                        mol_type = unassigned DNA
                        organism = Homo sapiens
SEQUENCE: 4
atggggagct gctgcagctg cctgaacaga gacagcgttc cagacaacca ccccaccaag   60
ttcaaggtga caaatgtgga tgatgagggg gtggagctgg gctctggggt gatggagctg   120
acgcagagtg agctggtgct gcacctgcat cggcgtgagg ccgtccgctg gccttatctc   180
tgcttgcggc gctatggcta cgactccaac ctcttctcct ttgagagtgg ccgccgatgt   240
cagacaggca agggaatatt tgcatttaag tgttcccggg ctgaggaaat cttcaacctc   300
cttcaggatc tgatgcagtg caacagcatc aatgtgatgg aagagcctgt catcatcacc   360
cgcaatagcc accccgctga gcttgacctc cctcgagccc cccagccacc caatgctcta   420
ggctacactg tctccagctt ttccaatggc tgccctggag agggcccacg attctcagct   480
ccccgggctc tctcgacaag cagcctgcgg caccccctcg ttggggaaga gtccacccat   540
gccctcattg ctcctgatga gcagtcccac acctatgtca acacaccggc cagtgaagat   600
gaccaccgca gggccgcca ctgcctgcag ccccctgcctg agggtcaggc acccttcctc   660
ccgcaggccc ggggacctga ccaacgggac ccacaggtgt tcttgcagcc aggccaggtg   720
aagtttgtgt tgggcccgac ccctgctcgg cggcacatgg tgaagtgcca gggcctctgt   780
cccagcctgc atgaccccc acaccacaat aataacaatg aggccccttc tgagtgtcca   840
gcccagccca agtgcaccta cgagaacgtc accggggggc tgtggcgagg ggctggctgg   900
agactgagcc cagaggagcc gggctggaat ggccttgccc accgccgggc cgccctgctg   960
cactatgaga acctgcccc actgcccct gtgtgggaaa gccaagccca gcagctggga   1020
ggggaggctg gggatgatgg ggactcgagg gatgggctca cccctcttc caatggcttc   1080
cctgatggtg aggaggacga gccccactg cagaagccca ccagcaccg ggccgccatc   1140
cgcagccacg gcagctttcc tgtgccactg acccgccgcc gcggctcccc aagggtcttc   1200
aactttgatt tccgccggcc ggggcccgag cccccaaggc agctaacta catccaggtg   1260
gagctaaagg gctggggtgg agaccgccct aaggggcccc agaaccctc gagcccccaa   1320
gccccatgc ccaccaccca ccctgcccga agctcagact cctacgccgt gattgacctc   1380
aaaaagaccg tggccatgtc caacctgcag agagctctgc cccgagacga tggcaccgcc   1440
aggaaaaccc ggcacaacag caccgacctg cctctg                            1476

SEQ ID NO: 5            moltype = AA   length = 356
FEATURE                 Location/Qualifiers
source                  1..356
                        mol_type = protein
                        organism = Homo sapiens
SEQUENCE: 5
MSRPLLITFT PATDPSDLWK DGQQQPQPEK PESTLDGAAA RAFYEALIGD ESSAPDSQRS   60
QTEPARERKR KKRRIMKAPA AEAVAEGASG RHGQGRSLEA EDKMTHRILR AAQEGDLPEL   120
RRLLEPHEAG GAGGNINARD AFWWTPLMCA ARAGQGAAVS YLLGRGAAWV GVCELSGRDA   180
AQLAEEAGFP EVARMVRESH GETRSPENRS PTPSLQYCEN CDTHFQDSNH RTSTAHLLSL   240
SQGPQPPNLP LGVPISSPGF KLLLRGGWEP GMGLGPRGEG RANPIPTVLK RDQEGLGYRS   300
APQPRVTHFP AWDTRAVAGR ERPPRVATLS WREERRREEK DRAWERDLRT YMNLEF       356

SEQ ID NO: 6            moltype = DNA   length = 1068
FEATURE                 Location/Qualifiers
source                  1..1068
                        mol_type = unassigned DNA
                        organism = Homo sapiens
SEQUENCE: 6
atgtcccggc ccttgctcat caccttcacc ccagccactg accccagcga cctctggaag   60
gatgggcagc agcagccaca gcccgagaag ccagagtcca ccctgatgg ggctgcagcc   120
cgagctttct atgaggccct gattggggat gagagcagcg ctcctgactc ccagagatct   180
cagactgaac ctgccagaga aagaaagaga aagaaagaa gaataatgaa ggcaccagca   240
gcagaagcag tggcagaagg agcatcagga agacatggac aagggagatc ccttgaggct   300
gaggataaga tgactcaccg gatactgagg gcagcccagg agggggacct gccagaactt   360
aggagactgc tggaaccgca tgaggcagga ggagctgggg gaatatcaa cgcccgggat   420
gccttctggt ggaccccact gatgtgtgct gctcgagcgg gccaggggc agctgtgagc   480
tatctcctgg gccgtgggc tgcctgggtg ggggtctgtg agctgagtgg cagggatgcg   540
gctcagctcg ctgaagaagc tggcttccct gaggtagcca gcatggtcag ggagagccat   600
ggagagacaa ggagcccgga aaaccgtct cctactccct ccctccagta ctgcgagaac   660
tgtgacaccc acttccaaga ttccaaccac cgcacatcca ctgctcacct gctgtcactg   720
tcgcaggtc ctcagcctcc caaccttcca cttgggggtgc ccatcccag cccgggcttc   780
aaactgctgc tgagggggg ctgggagcca ggaatgggc tggacccg gggtgagggc   840
cgtgccaatc ccatccccac tgtcctcaag agggaccagg aaggactagg ctacagatca   900
gcaccccagc ccgagtgac acattccca gcttgggata cacgggcagt ggctggggca   960
gagagaccc ctcgggtggc cacactgagc tggaggagg agagaaggag ggaggagagg   1020
gacagggctt gggagcggga tctaaggact tacatgaacc tcgagttc                1068

SEQ ID NO: 7            moltype = AA   length = 328
FEATURE                 Location/Qualifiers
```

US 12,540,940 B2

| | |
|---|---|
| source | 1..328<br>mol_type = protein<br>organism = Homo sapiens |

SEQUENCE: 7

```
MSSYLEYVSC SSSGGVGGDV LSLAPKFCRS DARPVALQPA FPLGNGDGAF VSCLPLAAAR    60
PSPSPPAAPA RPSVPPPAAP QYAQCTLEGA YEPGAAPAAA AGGADYGFLG SGPAYDFPGV   120
LGRAADDGGS HVHYATSAVF SGGGSFLLSG QVDYAAFGEP GPFSACLKAS ADGHPGAFQT   180
ASPAPGTYPK SVSPASGLPA AFSTFEWMKV KRNASKKGKL AEYGAASPSS AIRTNFSTKQ   240
LTELEKEFHF NKYLTRARRI EIANCLHLND TQVKIWFQNR RMKQKKRERE GLLATAIPVA   300
PLQLPLSGTT PTKFIKNPGS PSQSQEPS                                     328
```

| SEQ ID NO: 8 | moltype = DNA length = 984 |
|---|---|
| FEATURE | Location/Qualifiers |
| source | 1..984<br>mol_type = unassigned DNA<br>organism = Homo sapiens |

SEQUENCE: 8

```
atgagctcct acctggagta cgtgtcatgc agcagcagcg gcggggtcgg cggcgacgtg    60
ctcagcttgg cacccaagtt ctgccgctcc gacgcccggc ccgtggctct gcagcccgcc   120
ttccctctgg gcaacggcga cggcgccttc gtcagctgtc tgcccctggc cgccgcccga   180
ccctcgcctt cgccccccgc cgcccccgcg cggccgtccg taccgcctcc ggccgcgccc   240
cagtacgcgc agtgcaccct ggagggggcc tacgaacctg gcgccgcacc tgccgcggca   300
gctgggggcg cggactacgg cttcctgggg tccgggccgg cgtacgactt cccgggcgtg   360
ctggggcggg cggccgacga cggcgggtct cacgtccact acgccacctc ggccgtcttc   420
tcgggcggcg gctcttttcct cctcagcggc caggtggatt acgcggcctt cggcgaaccc   480
ggccctttt cggcttgtct caaagcgtca gccgacggcc acccgggtgc tttccagacc   540
gcatccccgg ccccaggcac ctaccccaag tccgtctctc ccgcctccgg cctccctgcc   600
gccttcagca cgttcgagtg gatgaaagtg aagaggaatg cctctaagaa aggcaaactc   660
gccgagtatg gggccgctag cccctccagc gcgatccgca cgaatttcag caccaagcaa   720
ctgacagaac tggaaaaaga gtttcatttc aataagtact taactcgggc ccggcgcatc   780
gagatagcca actgcttgca cctgaatgac acgcaagtca aaatctggtt ccagaaccgc   840
aggatgaaac agaagaaaag ggaacgagaa gggcttctgg ccacggccat tcctgtggct   900
ccctccaac ttccctctc tggaacaacc cccactaagt ttatcaagaa ccccggcagc   960
ccttctcagt cccaagagcc ttcg                                         984
```

| SEQ ID NO: 9 | moltype = AA length = 416 |
|---|---|
| FEATURE | Location/Qualifiers |
| source | 1..416<br>mol_type = protein<br>organism = Homo sapiens |

SEQUENCE: 9

```
MELRVGNKYR LGRKIGSGSF GDIYLGANIA SGEEVAIKLE CVKTKHPQLH IESKFYKMMQ    60
GGVGIPSIKW CGAEGDYNVM VMELLGPSLE DLFNFCSRKF SLKTVLLLAD QMISRIEYIH   120
SKNFIHRDVK PDNFLMGLGK KGNLVYIIDF GLAKKYRDAR THQHIPYREN KNLTGTARYA   180
SINTHLGIEQ SRRDDLESLG YVLMYFNLGS LPWQGLKAAT KRQKYERISE KKMSTPIEVL   240
CKGYPSEFST YLNFCRSLRF DDKPDYSYLR QLFRNLFHRQ GFSYDYVFDW NMLKFGAARN   300
PEDVDRERRE HEREERMGQL RGSATRALPP GPPTGATANR LRSAAEPVAS TPASRIQPAG   360
NTSPRAISRV DRERKVSMRL HRGAPANVSS SDLTGRQEVS RIPASQTSVP FDHLGK      416
```

| SEQ ID NO: 10 | moltype = DNA length = 1248 |
|---|---|
| FEATURE | Location/Qualifiers |
| source | 1..1248<br>mol_type = unassigned DNA<br>organism = Homo sapiens |

SEQUENCE: 10

```
atggagctac gtgtggggaa caagtaccgc ctgggacgga agatcgggag cgggtccttc    60
ggagatatct acctgggtgc caacatcgcc tctggtgagg aagtcgccat caagctggag   120
tgtgtgaaga caaagcaccc ccagctgcac atcgagagca agttctacaa gatgatgcag   180
ggtggcgtgg ggatcccgtc catcaagtgg tgcgagctga gggcgacta caacgtgatg   240
gtcatggagc tgctggggcc tagcctcgag gacctgttca acttctgttc ccgcaaattc   300
agcctcaaga cggtgctgct cttggccgac cagatgatca gccgcatcga gtatatccac   360
tccaagaact tcatccaccg ggacgtcaag cccgacaact tcctcatggg gctggggaag   420
aagggcaacc tggtctacat catcgacttc ggcctggcca gaagtaccg ggacgcccgc   480
acccaccagc acattcccta ccgggaaaac aagaacctga cgggcacggc ccgctacgct   540
tccatcaaca cgcacctggg cattgagcaa agccgtcgag atgacctgga gagcctgggc   600
tacgtgctca tgtacttcaa cctgggctcc ctgccctggc aggggctcaa agcagccacc   660
aagcgccaga gtatgaacg gatcagcgag aagaagatgt caacgcccat cgaggtcctc   720
tgcaaaggct atccctccga attctcaaca tacctcaact tctccgctc cctgcggttt   780
gacgacaagc ccgactactc ttacctacgt cagctcttcc gcaacctctt ccaccggcag   840
ggcttctcct atgactacgt ctttgactgg aacatgctga attcggtgc agcccggaat   900
cccgaggatg tggaccggga gcggcgagaa cacgaacgcg aggagaggat ggggcagcta   960
cgggggtccg cgaccgagc cctgcccct ggcccaccca ggggccac tgccaaccgg  1020
ctccgcagtg ccgccgagcc cgtggcttcc acgcagcct cccgcatcca gccggctggc  1080
aatactctc ccagagcgat ctcgcgggtc gaccgggaag gaaggtgag tatgaggctg  1140
cacagggtg cgcccgccaa cgtctcctcc tcagacctca ctgggcgcca agaggtctcc  1200
cggatcccag cctcacagac aagtgtgcca tttgaccatc tcgggaag              1248
```

| SEQ ID NO: 11 | moltype = AA length = 549 |
|---|---|
| FEATURE | Location/Qualifiers |

```
source                     1..549
                           mol_type = protein
                           organism = Homo sapiens
SEQUENCE: 11
MSPTISHKDS SRQRRPGNFS HSLDMKSGPL PPGGWDDSHL DSAGREGDRE ALLGDTGTGD      60
FLKAPQSFRA ELSSILLLLF LYVLQGIPLG LAGSIPLILQ SKNVSYTDQA FFSFVFWPFS     120
LKLLWAPLVD AVYVKNFGRR KSWLVPTQYI LGLFMIYLST QVDRLLGNTD DRTPDVIALT     180
VAFFLFEFLA ATQDIAVDGW ALTMLSRENV GYASTCNSVG QTAGYFLGNV LFLALESADF     240
CNKYLRFQPQ PRGIVTLSDF LFFWGTVFLI TTTLVALLKK ENEVSVVKEE TQGITDTYKL     300
LFAIIKMPAV LTFCLLILTA KIGFSAADAV TGLKLVEEGV PKEHLALLAV PMVPLQIILP     360
LIISKYTAGP QPLNTFYKAM PYRLLLGLEY ALLVWWTPKV EHQGGFPIYY YIVVLLSYAL     420
HQVTVYSMYV SIMAFNAKVS DPLIGGTYMT LLNTVSNLGG NWPSTVALWL VDPLTVKECV     480
GASNQNCRTP DAVELCKKLG GSCVTALDGY YVESIICVFI GFGWWFFLGP KFKKLQDEGS     540
SSWKCKRNN                                                             549

SEQ ID NO: 12              moltype = DNA   length = 1647
FEATURE                    Location/Qualifiers
source                     1..1647
                           mol_type = unassigned DNA
                           organism = Homo sapiens
SEQUENCE: 12
atgtcaccca ccatctccca caaggacagc agccggcaac ggcggccagg gaatttcagt      60
cactctctgg atatgaagag cggtcccctg ccgccaggcg gttgggatga cagtcatttg     120
gactcagcgg gccggaagg  ggacagagaa gctcttctgg gggataccgg cactggcgac     180
ttcttaaaag ccccacagag cttccgggcc gaactaagca gcattttgct actactcttt     240
ctttacgtgc ttcagggtat tcccctgggc ttggcgggag gcatccacct cattttgcaa     300
agcaaaaatg ttagctatac agaccaagct ttccttcagt ttgtcttttg gcccttcagt     360
ctcaaattac tctgggcccc gttggttgat gcggtctacg ttaagaactt cggtcgtcgc     420
aaatcttggc ttgtcccgac acagtatata ctaggactct tcatgatcta tttatccact     480
caggtggacc gtttgcttgg gaataccgat gacagaaccc cgacgtgat  tgctctcact     540
gtggcgttct ttttgtttga attcttggcc gccactcagg acattgccgt cgatggttga     600
gcgttaacta tgttatccag ggaaaatgtg ggttatgctt ctacttgcaa ttcggtgggc     660
caaacagcgg gttactttt  gggcaatgtt ttgttttggc ccttgaatc  tgccgactt      720
tgtaacaaat atttgcggtt tcagcctcaa cccagaggaa tcgttactct ttcagatttc     780
ctttttttct ggggaactgt atttttaata acaaacaat  tgttgccct  tctgaaaaaa     840
gaaaacgaag tatcagtagt aaaagaagaa acacaaggga tcacagatac ttacaagctg     900
ctttttgcaa ttataaaaat gccagcagtt ctgacatttt gccttctgat tctaactgca     960
aagattggtt ttcagcagc  agatgctgta acaggactga aattggtaga agagggagta    1020
cccaaagaac atttagcctt attggcagtt ccaatggtgc ctttgcagat aatactgcct    1080
ctgattatca gcaaatacac tgcaggtccc cagccattaa acacatttta caaagccatg    1140
ccctacagat tattgcttgg gttagaatat gcccctactg gttttggtgga tcctaaagta    1200
gaacatcaag ggggattccc tatatattac tatatcgtag tcctgctgag ttatgcttta    1260
catcaggtta cagtgtacag catgtatgtt tctataatgg ctttcaatgc aaaggttagt    1320
gatccactta ttggaggaac atacatgacc cttttaaata ccgtgtccaa tctgggagga    1380
aactggcctt ctacagtagc tctttggctt gtagatcccc tcacagtaaa agagtgtgta    1440
ggagcatcaa accagaattg tcgaacacct gatgctgttg agctttgcaa aaaactgggt    1500
ggctcatgtg ttacagccct ggatggttat tatgtggagt ccattatttg tgtttttcatt    1560
ggatttggtt ggtggttctt tcttggtcca aaatttaaaa agttacagga tgaaggatca    1620
tcttcgtgga aatgcaaaag gaacaat                                        1647

SEQ ID NO: 13              moltype = AA   length = 470
FEATURE                    Location/Qualifiers
source                     1..470
                           mol_type = protein
                           organism = Homo sapiens
SEQUENCE: 13
MMAAMATARV RMGPRCAQAL WRMPWLPVFL SLAAAAAAAA AEQQVPLVLW SSDRDLWAPA      60
ADTHEGHITS DLQLSTYLDP ALELGPRNVL LFLQDKLSIE DFTAYGGVFG NKQDSAFSNL     120
ENALDLAPSS LVLPAVDWYA VSTLTTYLQE KLGASPLHVD LATLRELKLN ASLPALLLIR     180
LPYTASSGLM APREVLTGND EVIGQVLSTL KSEDVPYTAA LTAVRPSRVA RDVAVVAGGL     240
GRQLLQKQPV SPVIHPPVSY NDTAPRILFW AQNFSVAYKD QWEDLTPLTF GVQELNLTGS     300
FWNDSFARLS LTYERLFGTT VTFKFILANR LYPVSARHWF TMERLEVHSN GSVAYFNASQ     360
VTGPSIYSFH CEYVSSLSKK GSLLVARTQP SPWQMMLQDF QIQAFNVMGE QFSYASDCAS     420
FFSPGIWMGL LTSLFMLFIF TYGLHMILSL KTMDRFDDHK GPTISLTQIV                470

SEQ ID NO: 14              moltype = DNA   length = 1410
FEATURE                    Location/Qualifiers
source                     1..1410
                           mol_type = unassigned DNA
                           organism = Homo sapiens
SEQUENCE: 14
atgatggcgg ccatggcgac ggctcgagtg cggatgggc  cgcggtgcgc ccaggcgctc      60
tggcgcatgc cgtggctgcc ggtgtttttg tcgttggcgg cggcggcggc ggcggcagcg     120
gcggagcagc aggtcccgct ggtgctgtgg tcgagtgacc gggacttgtg ggctcctgcg     180
gccgacactc atgaaggcca catcaccagc gacttgcagc tctctaccta cttagatccc     240
gccctggagc tgggtcccag gaatgtgctg ctgttcctgc aggacaagct gagcattgag     300
gatttcacag catatggcgg tgtgtttgga aacaagcagg acagcgcctt ttctaaccta     360
gagaatgccc tggacctggc ccctcctca  ctggtgcttc ctgccgtcga ctggtatgca     420
gtcagcactc tgaccactta cctgcaggag aagctcgggg ccagccccctt gcatgtggac     480
```

```
ctggccaccc tgcgggagct gaagctcaat gccagcctcc ctgctctgct gctcattcgc  540
ctgccctaca cagccagctc tggtctgatg gcaccaggg aagtcctcac aggcaacgat  600
gaggtcatcg ggcaggtcct gagcacactc aagtccgaag atgtcccata cacagcggcc  660
ctcacagcgt tccgccctto cagggtggcc cgtgatgtag ccgtggtggc cggagggcta  720
ggtcgccagc tgctacaaaa acagccagta tcacctgtga tccatcctcc tgtgagttac  780
aatgacaccg ctccccggat cctgttctgt gcccaaaact tctctgtggc gtacaaggac  840
cagtgggagg acctgactcc cctcaccttt ggggtgcagg aactcaacct gactggtcc  900
ttctggaatg actcctttgc caggctctca ctgacctatg aacgactctt tggtaccaca  960
gtgacattca agttcattct ggccaaccgc ctctacccag tgtctgcccg gcactggttt 1020
accatggagc gcctcgaagt ccacagcaat ggctccgtcg cctacttcaa tgcttcccag 1080
gtcacagggc cagcatctctcttccac tgcgagtatg tcagcagcct gagcaagaag 1140
ggtagtctcc tcgtggcccg cacgcagccc tctccctggc agatgatgct tcaggacttc 1200
cagatccagg ctttcaacgt aatggggag cagttctcct acgccagcga ctgtgccagc 1260
ttcttctccc ccggcatctg gatggggctg ctcacctcc tgttcatgct cttcatcttc 1320
acctatggcc tgcacatgat cctcagcctc aagaccatgg atcgctttga tgaccacaag 1380
ggccccacta tttctttgac ccagattgtg                                  1410

SEQ ID NO: 15           moltype = AA  length = 192
FEATURE                 Location/Qualifiers
source                  1..192
                        mol_type = protein
                        organism = Homo sapiens
SEQUENCE: 15
MQAIKCVVVG DGAVGKTCLL ISYTTNAFPG EYIPTVFDNY SANVMVDGKP VNLGLWDTAG   60
QEDYDRLRPL SYPQTDVFLI CFSLVSPASF ENVRAKWYPE VRHHCPHTPI LLVGTKLDLR  120
DDKDTIERLR DKKLAPITYP QGLAMAREIG SVKYLECSAL TQRGLKTVFD EAIRAVLCPP  180
PVKKPGKKCT VF                                                     192

SEQ ID NO: 16           moltype = DNA  length = 576
FEATURE                 Location/Qualifiers
source                  1..576
                        mol_type = unassigned DNA
                        organism = Homo sapiens
SEQUENCE: 16
atgcaggcca tcaagtgcgt ggtggtcggc gacggcgccg tggggaagac atgcttgctg   60
atcagctaca cgaccaacgc cttccccgga gagtacatcc ccaccgtttt tgacaactac  120
tctgccaacg tgatggtgga cgggaaacca gtcaacttgg ggctgtggga cacagcgggt  180
caggaggact acgatcggct gcggccactc tcctacccc aaactgacgt ctttctgatc  240
tgcttctctc tggtgagccc ggcctccttc gagaatgttc gtgccaagtg gtacccggag  300
gtgcggcacc actgccccca cacgcccatc ctcctggtgg gcaccaagct ggacctccgc  360
gacgacaagg acaccattga gcggctgcgg gacaagaagc tggcacccat cacctaccca  420
cagggcctgg ccatggcccg ggagattggc tctgtgaaat acctggagtg ctcagccctg  480
acccagcggg gcctgaagac agtgtttgac gaggcgatcc gcgcggtgct ctgcccgccc  540
ccagtgaaga agccggggaa gaagtgcacc gtcttc                           576

SEQ ID NO: 17           moltype = AA  length = 247
FEATURE                 Location/Qualifiers
source                  1..247
                        mol_type = protein
                        organism = Homo sapiens
SEQUENCE: 17
MTILFLTMVI SYFGCMKAAP MKEANIRGQG GLAYPGVRTH GTLESVNGPK AGSRGLTSLA   60
DTFEHMIEEL LDEDQKVRPN EENNKDADLY TSRVMLSSQV PLEPPLLFLL EEYKNYLDAA  120
NMSMRVRRHS DPARRGELSV CDSISEWVTA ADKKTAVDMS GGTVTVLEKV PVSKGQLKQY  180
FYETKCNPMG YTKEGCRGID KRHWNSQCRT TQSYVRALTM DSKKRIGWRF IRIDTSCVCT  240
LTIKRGR                                                           247

SEQ ID NO: 18           moltype = DNA  length = 741
FEATURE                 Location/Qualifiers
source                  1..741
                        mol_type = unassigned DNA
                        organism = Homo sapiens
SEQUENCE: 18
atgaccatcc ttttccttac tatggttatt tcatactttg gttgcatgaa ggctgccccc   60
atgaaagaag caaacatccg aggacaaggt ggcttggcct acccaggtgt gcggacccat  120
gggactctgg agagcgtgaa tgggcccaag gcaggttcaa gaggcttgac atcattggct  180
gacacttcg aacacatgat agaagagctg ttggatgagg accagaaagt tcggcccaat  240
gaagaaaaca ataaggacgc agacttgtac acgtccaggg tgatgctcag tagtcaagtg  300
cctttggagc ctcctcttct ctttctgctg gaggaataca aaattaccct agacgctgca  360
aacatgtcca tgagggtccg gcgccactct gaccctgccc gccgagggga gctgagcgtg  420
tgtgacagta ttagtgagtg ggtaacggcg gcagacaaaa agactgcagt ggacatgtcg  480
ggcgggacgg tcacagtcct tgaaaaggtc cctgtatcaa aaggccaact gaagcaatac  540
ttctacgaga ccaagtgcaa tcccatgggt tacacaaaag aaggctgcag ggcatagac  600
aaaaggcatt ggaactccca gtgccgaact cccagtcgt acgtgcgggc ccttaccatg  660
gatagcaaaa agagaattgg ctggcgattc ataaggatag acacttcttg tgtatgtaca  720
ttgaccatta aaaggggaag a                                           741

SEQ ID NO: 19           moltype = AA  length = 181
FEATURE                 Location/Qualifiers
```

```
source                  1..181
                        mol_type = protein
                        organism = Homo sapiens
SEQUENCE: 19
MMLQHPGQVS ASEVSASAIV PCLSPPGSLV FEDFANLTPF VKEELRFAIQ NKHLCHRMSS   60
ALESVTVSDR PLGVSITKAE VAPEEDERKK RRRERNKIAA AKCRNKKKEK TECLQKESEK  120
LESVNAELKA QIEELKNEKQ HLIYMLNLHR PTCIVRAQNG RTPEDERNLF IQQIKEGTLQ  180
S                                                                 181

SEQ ID NO: 20           moltype = DNA  length = 543
FEATURE                 Location/Qualifiers
source                  1..543
                        mol_type = unassigned DNA
                        organism = Homo sapiens
SEQUENCE: 20
atgatgcttc aacacccagg ccaggtctct gcctcggaag tgagtgcttc tgccatcgtc   60
ccctgcctgt cccctcctgg gtcactggtg tttgaggatt ttgctaacct gacgcccttt  120
gtcaaggaag agctgaggtt tgccatccag aacaagcacc tctgccaccg gatgtcctct  180
gcgctggaat cagtcactgt cagcgacaga ccctcgggg tgtccatcac aaaagccgag  240
gtagccctg aagaagatga aggaaaaag aggcgacgag aaagaaataa gattgcagct  300
gcaaagtgcc gaaacaagaa gaaggagaag acggagtgcc tgcagaaaga gtcggagaag  360
ctggaaagtg tgaatgctga actgaaggct cagattgagg agctcaagaa cgagaagcag  420
catttgatat acatgctcaa ccttcatcgg cccacgtgta ttgtccgggc tcagaatggg  480
aggactccag aagatgagag aaacctcttt atccaacaga taaagaagg aacattgcag  540
agc                                                               543

SEQ ID NO: 21           moltype = AA   length = 868
FEATURE                 Location/Qualifiers
source                  1..868
                        mol_type = protein
                        organism = Homo sapiens
SEQUENCE: 21
MATFISVQLK KTSEVDLAKP LVKFIQQTYP SGGEEQAQYC RAAEELSKLR RAAVGRPLDK   60
HEGALETLLR YYDQICSIEP KFPFSENQIC LTFTWKDAFD KGSLFGGSVK LALASLGYEK  120
SCVLFNCAAL ASQIAAEQNL DNDEGLKIAA KHYQFASGAF LHIKETVLSA LSREPTVDIS  180
PDTVGTLSLI MLAQAQEVFF LKATRDKMKD AIIAKLANQA ADYFGDAFKQ CQYKDTLPKE  240
VFPVLAAKHC IMQANAEYHQ SILAKQQKKF GEEIARLQHA AELIKTVASR YDEYVNVKDF  300
SDKINRALAA AKKDNDFIYH DRVPDLKDLD PIGKATLVKS TPVNVPISQK FTDLFEKMVP  360
VSVQQSLAAY NQRKADLVNR SIAQMREATT LANGVLASLN LPAAIEDVSG DTVPQSILTK  420
SRSVIEQGGI QTVDQLIKEL PELLQRNREI LDESLRLLDE EEATDNDLRA KFKERWQRTP  480
SNELYKPLRA EGTNFRTVLD KAVQADGQVK ECYQSHRDTI VLLCKPEPEL NAAIPSANPA  540
KTMQGSEVVN VLKSLLSNLD EVKKEREGLE NDLKSVNFDM TSKFLTALAQ DGVINEEALS  600
VTELDRVYGG LTTKVQESLK KQEGLLKNIQ VSHQEFSKMK QSNNEANLRE EVLKNLATAY  660
DNFVELVANL KEGTKFYNEL TEILVRFQNK CSDIVFARKT ERDELLKDLQ QSIAREPSAP  720
SIPTPAYQSS PAGGHAPTPP TPAPRTMPPT KPQPPARPPP PVLPANRAPS ATAPSPVGAG  780
TAAPAPSQTP GSAPPPQAQG PPYPTYPGYP GYCQMPMPMG YNPYAYGQYN MPYPPVYHQS  840
PGQAPYPGPQ QPSYPFPQPP QQSYYPQQ                                    868

SEQ ID NO: 22           moltype = DNA   length = 2604
FEATURE                 Location/Qualifiers
source                  1..2604
                        mol_type = unassigned DNA
                        organism = Homo sapiens
SEQUENCE: 22
atggcgacat tcatctcggt gcagctgaaa aagaccctcag aggtggacct ggccaagccg   60
ctggtgaagt tcatccagca gacttaccca agcggcgggg aagagcaggc ccagtactgc  120
cgcgcggcgg aggagctcag caagctcgc cgcgccgcag tcggtcgtcc gctggacaag  180
cacgagggcg cgctcgagac gctcctgaga tattatgatc agatttgttc tattgaaccc  240
aaatttccat tttctgaaaa tcagatctgc ttgacattta cctggaagga tgctttcgat  300
aaaggttcac ttttttggagg ctctgtaaaa ctggctcttg caagcttagg atatgaaaag  360
agctgtgtgt tgttcaattg tgcagcctta gctagccaaa ttgcagcaga acagaacctg  420
gataatgatg aaggattgaa aatcgctgct aaacattacc agtttgctag tggtgccttt  480
ttacatatta aagagacggt tttatctgcc ttaagtcgag agccgaccgt ggacatatct  540
ccagatactg ttgggaccct cagtcttatt atgctgcaa aggctcaaga agtatttttt  600
ttaaaagcca caagagataa aatgaaagat gccatcatag ctaaattggc taatcaggct  660
gcagattatt ttggtgatgc tttcaaacag tgtcaataca agatactct ccccaaggag  720
gtgttccctg tcttggctgc aaagcactgt atcatgcagg ccaatgctga gtaccatcag  780
tctatcctgg caaaacagca gaaaaattt ggagaagaaa ttgcaaggtt acagcatgca  840
gcagaactga ttaaaacagt ggcatctcgc tatgatgaat atgttaatgt gaaggatttt  900
tctgacaaaa tcaatcgtgc ccttgctgca gcaagaaagg ataatgactt catttatcat  960
gatcgagttc cagaccttaa agatctagat cctattggca agccacact tgtgaaatct 1020
acccccggtca atgtacccat cagtcagaaa tttactgatc tgtttgagaa gatggttccc 1080
gtgtcagtac agcagtcttt ggctgcctat aatcagagga agccgatttt ggttaacaga 1140
tcaattgctc agatgagaga agccaccact tggccaaatg gggtgctagc ttccttaat 1200
cttccagcga caattgaaga tgtgtctgga cactgtac ctcagtctat attgactaaa 1260
tccagatctg tgattgaaca gggaggcatc cagactgttg atcagttgat taagaaactg 1320
cctgaattac tgcaacgaaa tagagaaatc ctagatgagt cattaaggtt gttggatgaa 1380
gaagaagcaa ccgataatga tttaagagca aaatttaagg aacgttggca aaggacacca 1440
tccaatgaac tgtataagcc tttaagagca gagggaacca acttcagaac agttttagat 1500
```

```
aaagctgtgc aggcagatgg acaagtgaaa gaatgttacc agtctcatcg tgacaccatc    1560
gtgcttttgt gtaagccaga gcctgagctg aatgctgcca tcccttctgc taatccagca    1620
aagaccatgc agggcagtga ggttgtaaat gtcttaaaat ccttattgtc aaatcttgat    1680
gaagtaaaga aggaaagaga gggtctggag aatgacttga aatctgtgaa ttttgacatg    1740
acaagcaagt ttttgacagc cctggctcaa gatggtgtga taaatgaaga agctctttct    1800
gttactgaac tagatcgagt ctatggaggt cttacaacta aagtccaaga atctctaaag    1860
aaacaggagg gacttcttaa aaatattcag gtctcacatc aggaattttc aaaaatgaaa    1920
caatctaata atgaagctaa cttaagagaa gaagttttga agaatttagc tactgcatat    1980
gacaactttg ttgaacttgt agctaatttg aaggaaggca caaagtttta caatgagttg    2040
actgaaatcc tggtcaggtt ccagaacaaa tgcagtgata tagttttttgc acggaagaca    2100
gaaagagatg aactcttaaa ggacttgcaa caaagcattg ccagagaacc tagtgctcct    2160
tcaattccta cacctgcgta tcagtcctca ccagcaggag acatgcacc aactcctcca     2220
actccagcgc caagaaccat gccgcctact aagccccagc cccagccag gcctccacca     2280
cctgtgcttc cagcaaatcg agctccttct gctactgctc catctccagt gggggctggg    2340
actgctgcgc cagctccatc acaaacgcct ggctcagctc ctcctccaca ggcgcaggg     2400
ccaccctatc ccacctatcc aggatatcct gggtattgcc aaatgcccat gcccatgggc    2460
tataatcctt atgcgtatgg ccagtataat atgccatatc caccagtgta tcaccagagt    2520
cctggacagg ctccatacccc gggaccccag cagccttcat acccctcccc tcagccccca    2580
cagcagtctt actatccaca gcag                                           2604

SEQ ID NO: 23            moltype = AA  length = 215
FEATURE                  Location/Qualifiers
source                   1..215
                         mol_type = protein
                         organism = Homo sapiens
SEQUENCE: 23
MASRGATRPN GPNTGNKICQ FKLVLLGESA VGKSSLVLRF VKGQFHEFQE STIGAAFLTQ    60
TVCLDDTTVK FEIWDTAGQE RYHSLAPMYY RGAQAAIVVY DITNEESFAR AKNWVKELQR    120
QASPNIVIAL SGNKADLANK RAVDFQEAQS YADDNSLLFM ETSAKTSMNV NEIFMAIAKK    180
LPKNEPQNPG ANSARGRGVD LTEPTQPTRN QCCSN                               215

SEQ ID NO: 24            moltype = DNA  length = 645
FEATURE                  Location/Qualifiers
source                   1..645
                         mol_type = unassigned DNA
                         organism = Homo sapiens
SEQUENCE: 24
atggctagtc gaggcgcaac aagacccaac gggccaaata ctggaaataa aatatgccag    60
ttcaaactag tacttctggg agagtccgct gttggcaaat caagcctagt gcttcgtttt    120
gtgaaaggcc aatttcatga atttcaagag agtaccattg gggctgcttt tctaacccaa    180
actgtatgtc ttgatgacac tacagtaaag tttgaaatat gggatacagc tggtcaagaa    240
cgataccata gcctagcacc aatgtactac agaggagcac aagcagccat agttgtatat    300
gatatcacaa atgaggagtc ctttgcaaga gcaaaaaatt gggttaaaga acttcagagg    360
caagcaagtc ctaacattgt aatagcttta tcgggaaaca aggccgacct agcaaataaa    420
agagcagtag atttccagga agcacagtcc tatgcagatg acaatagttt attattcatg    480
gagacatccg ctaaaacatc aatgaatgta atgaaatat tcatggcaat agctaaaaaa    540
ttgccaaaga tgaaccaca aaatccagga gcaaattctg ccagaggaag aggagtagac    600
cttaccgaac ccacacaacc aaccaggaat cagtgttgta gtaac                    645

SEQ ID NO: 25            moltype = AA  length = 482
FEATURE                  Location/Qualifiers
source                   1..482
                         mol_type = protein
                         organism = Homo sapiens
SEQUENCE: 25
MAAVRMLRTW SRNAGKLICV RYFQTCGNVH VLKPNYVCFF GYPSFKYSHP HHFLKTTAAL    60
RGQVVQPKLS DIGEGIREVT VKEWYVKEGD TVSQFDSICE VQSDKASVTI TSRYDGVIKK    120
LYYNLDDIAY VGKPLVDIET EALKDSEEDV VETPAVSHDE HTHQEIKGRK TLATPAVRRL    180
AMENNIKLSE VVGSGKDGRI LKEDILNYLE KQTGAILPPS PKVEIMPPPP KPKDMTVPIL    240
VSKPPVFTGK DKTEPIKGFQ KAMVKTMSAA LKIPHFGYCD EIDLTELVKL REELKPIAFA    300
RGIKLSFMPF FLKAASLGLL QFPILNASVD ENCQNITYKA SHNIGIAMDT EQGLIVPNVK    360
NVQICSIFDI ATELNRLQKL GSVGQLSTTD LTGGTFTLSN IGSIGGTFAK PVIMPPEVAI    420
GALGSIKAIP RFNQKGEVYK AQIMNVSWSA DHRVIDGATM SRFSNLWKSY LENPAFMLLD    480
LK                                                                   482

SEQ ID NO: 26            moltype = DNA  length = 1446
FEATURE                  Location/Qualifiers
source                   1..1446
                         mol_type = unassigned DNA
                         organism = Homo sapiens
SEQUENCE: 26
atggctgcag tccgtatgct gagaacctgg agcaggaatg cggggaagct gatttgtgtt    60
cgctattttc aaacatgtgg taatgttcat gttttgaagc caattatgt gtgtttcttt    120
ggttatcctt cattcaagta tagtcatcca catcacttcc tgaaaacaac tgctgctctc    180
cgtggacagg ttgttcagtt caagctctca gacattggag aagggattag agaagtaact    240
gttaaagaat ggtatgtaaa agaaggagat acagtgtctc agtttgatag catctgtgaa    300
gttcaaagtg ataagcttc tgttaccatc actagtcgtt atgatggagt cattaaaaaa    360
ctctattata atctagacga tattgcctat gtggggaagc cattagtaga catagaaacg    420
gaagctttaa aagattcaga agaagatgtt gttgaaactc ctgcagtgtc tcatgatgaa    480
```

-continued

```
catacacacc aagagataaa gggccgaaaa acactggcaa ctcctgcagt tcgccgtctg 540
gcaatggaaa acaatattaa gctgagtgaa gttgttggct caggaaaaga tggcagaata 600
cttaaagaag atatcctcaa ctatttggaa aagcagacag gagctatatt gcctccttca 660
cccaaagttg aaattatgcc acctccacca aagccaaaag acatgactgt tcctatacta 720
gtatcaaaac ctccggtatt cacaggcaaa gacaaaacag aaacccataa aggctttcaa 780
aaagcaatgg tcaagactat gtctgcagcc ctgaagatac ctcatttttgg ttattgtgat 840
gagattgacc ttactgaact ggttaagctc cgagaagaat aaaacccat tgcatttgct 900
cgtgaatta aactctcctt tatgccttt ttccttaagg ctgcttcctt gggattacta 960
cagtttccta tccttaacgc ttctgtggat gaaaactgcc agaatataac atataaggct 1020
tctcataaca ttgggatagc aatggatact gagcagggtt tgattgtccc taatgtgaaa 1080
aatgttcaga tctgctctat atttgacatc gccactgaac tgaaccgcct ccagaaattg 1140
ggctctgtgg tcagctcag caccactgat cttacaggag gaacatttac tctttccaac 1200
attggatcaa ttggtggtac ctttgccaaa ccagtgataa tgccacctga gtagccatt 1260
ggggcccttg gatcaattaa ggccattccc cgatttaatc agaaaggaga agtatataag 1320
gcacagataa tgaatgtgag ctggtcagct gatcacagag ttattgatgg tgctacaatg 1380
tcacgcttct ccaatttgtg gaaatcctat ttagaaaacc cagcttttat gctactagat 1440
ctgaaa                                                             1446

SEQ ID NO: 27           moltype = AA   length = 473
FEATURE                 Location/Qualifiers
source                  1..473
                        mol_type = protein
                        organism = Homo sapiens
SEQUENCE: 27
MAQLEGYYFS AALSCTFLVS CLLFSAFSRA LREPYMDEIF HLPQAQRYCE GHFSLSQWDP  60
MITTLPGLYL VSIGVIKPAI WIFGWSEHVV CSIGMLRFVN LLFSVGNFYL LYLLFCKVQP 120
RNKAASSIQR VLSTLTLAVF PTLYFFNFLY YTEAGSMFFT LFAYLMCLYG NHKTSAFLGF 180
CGFMFRQTNI IWAVFCAGNV IAQKLTEAWK TELQKKEDRL PPIKGPFAEF RKILQFLLAY 240
SMSFKNLSML LLLTWPYILL GFLFCAFVVV NGGIVIGDRS SHEACLHFPQ LFYFFSFTLF 300
FSFPHLLSPS KIKTFLSLVW KRRILFFVVT LVSVFLVWKF TYAHKYLLAD NRHYTFYVWK 360
RVFQRYETVK YLLVPAYIFA GWSIADSLKS KSIFWNLMFF ICLFTVIVPQ KLLEFRYFIL 420
PYVIYRLNIP LPPTSRLICE LSCYAVVNFI TFFIFLNKTF QWPNSQDIQR FMW        473

SEQ ID NO: 28           moltype = DNA   length = 1419
FEATURE                 Location/Qualifiers
source                  1..1419
                        mol_type = unassigned DNA
                        organism = Homo sapiens
SEQUENCE: 28
atggcgcagc tggaaggtta ctatttctcg gccgccttga gctgtacctt tttagtatcc   60
tgcctcctct tctccgcctt cagccgggcg ttgcgagagc cctacatgga cgagatcttc  120
cacctgcctc aggcgcagcg ctactgtgag ggccattttct cccttttccca gtgggatccc  180
atgattacta cattacctgg ccttgtacctg gtgtcaattg gagtgatcaa acctgccatt  240
tggatctttg gatggtctga acatgttgtc tgctccattg gatgctcag atttgttaat  300
cttctcttca gtgttggcaa cttctcattta ctatatattgc ttttctgcaa ggtacaaccc  360
agaaacaagg ctgcctcaag tatccagaga gtcttgtcaa cattaacact agcagtattt  420
ccaacacttt atttttttaa cttcccttat tatacagaag caggatcat gttttttact  480
cttttttgcgt atttgatgtg tcttttatgga aatcataaaa cttcagcctt ccttggattt  540
tgtggcttca tgtttcggca aacaaatatc atctgggctg tcttctgtgc aggaaatgtc  600
attgcacaaa agttaacgga ggcttggaaa actgagctac aaaagaagga agacagactt  660
ccacctatta aaggaccatt tgcagaattc agaaaaattc ttcagttct ttttggcttat  720
tccatgtcct ttaaaaactt gagtatgctt ttgcttctga cttggcccta catccttctg  780
ggatttctgt tttgtgcttt tgtagtagtt aatggtggaa ttgttattgg cgatcggagt  840
agtcatgaag cctgtcttca ttttcctcaa ctattctact ttttttcatt tactctcttt  900
ttttcctttc ctcatctcct gtctcctagc aaaattaaga ctttttctttc cttagtttgg  960
aaacgtagaa ttctgttttt tgtggttacc ttagtctctg tgtttttagt ttggaaattc 1020
acttatgctc ataaatactt gctagcagac aatagacatt atactttcta tgtgtggaaa 1080
agagtttttc aaagatatga aactgtaaaa tatttgttag ttccagccta tatttgct  1140
ggttggagta tagctgactc attgaaatca aagtcaattt tttggaattt aatgtttttc 1200
atatgcttgt tcactgttat agttcctcag aaactgctgg aatttcgtta cttcatttta 1260
ccttatgtca tttataggct taacatacct ctgcctccca catccagact catttgtgaa 1320
ctgagctgct atgcagttgt taatttcata acttttttca tctttctgaa caagactttt 1380
cagtggccaa atagtcagga cattcaaagg tttatgtgg                         1419

SEQ ID NO: 29           moltype = AA   length = 440
FEATURE                 Location/Qualifiers
source                  1..440
                        mol_type = protein
                        organism = Homo sapiens
SEQUENCE: 29
MGSSHLLNKG LPLGVRPPIM NGPLHPRPLV ALLDGRDCTV EMPILKDVAT VAFCDAQSTQ  60
EIHEKVLNEA VGALMYHTIT LTREDLEKFK ALRIIVRIGS GFDNIDIKSA GDLGIAVCNV 120
PAASVEETAD STLCHILNLY RRATWLHQAL REGTRVQSVE QIREVASGAA RIRGETLGII 180
GLGRVGQAVA LRAKAFGFNV LFYDPYLSDG VERALGLQRV STLQDLLFHS DCVTLHCGLN 240
EHNHHLINDF TVKQMRQGAF LVNTARGGLV DEKALAQALK EGRIRGAALD VHESEPFSFS 300
QGPLKDAPNL ICTPHAAWYS EQASIEMREE AAREIRRAIT GRIPDSLKNC VNKDHLTAAT 360
HWASMDPAVV HPELNGAAYR YPPGVVGVAP TGIPAAVEGI VPSAMSLSHG LPPVAHPPHA 420
PSPGQTVKPE ADRDHASDQL                                              440
```

-continued

```
SEQ ID NO: 30           moltype = DNA  length = 1320
FEATURE                 Location/Qualifiers
source                  1..1320
                        mol_type = unassigned DNA
                        organism = Homo sapiens
SEQUENCE: 30
atgggcagct cgcacttgct caacaagggc ctgccgcttg cgtccgacct tccgatcatg    60
aacgggcccc tgcaccccgcg gcccctggtg cattgctgg atggccggga ctgcacagtg   120
gagatgccca tcctgaagga cgtggccact gtggccttct gcgacgcgca gtccacgcag   180
gagatccatg agaaggtcct gaacgaggct gtggggggcc tgatgtacca ccatcact    240
ctcaccaggg aggacctgga gaagttcaaa gccccgca tcatcgtccg gattggcagt    300
ggttttgaca acatcgacat caagtcggcc ggggatttag gcattgccgt ctgcaacgtg   360
cccgcggcgt ctgtggagga cacggccgac tcgacgctgt gccacatcct gaacctgtac   420
cggcggggcca cctggctgca ccaggcgctg cgggagggca cacgagtcca gagcgtcgag   480
cagatccgcg aggtggcgtc cggcgctgcc aggatccgcg gggagacctt gggcatcatc   540
ggacttggtc cgctggggca ggcagtgcg ctgcgggcca aggccttcgg cttcaacgtg    600
ctcttctacg acccttactt gtcggatggc gtggagcggg cgctgggggct gcagcgtgtc  660
agcaccctgc aggacctgct cttccacagc gactgcgtga ccctgcactg cggcctcaac   720
gagcacaacc accacctcat caacgacttc accgtcaagc agatgagaca aggggccttc   780
ctggtgaaca cagcccgggg tggcctggtg gatgagaagg cgctggccca ggccctgaag   840
gagggccgga tccgcggcgc ggccctggat gtgcacgagt cggaacccct tcagctttagc  900
caggggccctc tgaaggatgc acccaacctc tctgcaccc ccatgctgcc atggtacgac   960
gagcaggcat ccatcgagat gcgagaggag gcgcacggg agatccgcag agccatcaca  1020
ggccggatcc cagacagcct gaagaactgt gtcaacaagg accatctgac agccgccacc  1080
cactgggcca gcatggaccc cgccgtcgtg cacctgagc tcaatggggc tgcctatagg  1140
tacctccgg gcgtggtggg cgtggccccc actggcatcc cagctgctgt ggaaggtatc  1200
gtccccagcg ccatgtccct gtcccacgge ctgcccctg tggccccacce gccccacgcc  1260
ccttctcctg gccaaaccgt caagcccgag gcggatagag accacgccag tgaccagttg  1320

SEQ ID NO: 31           moltype = AA  length = 317
FEATURE                 Location/Qualifiers
source                  1..317
                        mol_type = protein
                        organism = Homo sapiens
SEQUENCE: 31
MYNMMETELK PPGPQQTSGG GGGNSTAAAA GGNQKNSPDR VKRPMNAFMV WSRGQRRKMA    60
QENPKMHNSE ISKRLGAEWK LLSETEKRPF IDEAKRLRAL HMKEHPDYKY RPRRKTKTLM   120
KKDKYTLPGG LLAPGGNSMA SGVGVGAGLG AGVNQRMDSY AHMNGWSNGS YSMMQDQLGY   180
PQHPGLNAHG AAQMQPMHRY DVSALQYNSM TSSQTYMNGS PTYSMSYSQQ GTPGMALGSM   240
GSVVKSEASS SPPVVTSSSH SRAPCQAGDL RDMISMYLPG AEVPEPAAPS RLHMSQHYQS   300
GPVPGTAING TLPLSHM                                                  317

SEQ ID NO: 32           moltype = DNA  length = 951
FEATURE                 Location/Qualifiers
source                  1..951
                        mol_type = unassigned DNA
                        organism = Homo sapiens
SEQUENCE: 32
atgtacaaca tgatggagac ggagctgaag ccgccgggcc cgcagcaaac ttcggggggc    60
ggcggcggca actccaccgc ggcggcggcc ggcggcaacc agaaaaacag cccggaccgc   120
gtcaagcggc ccatgaatgc cttcatggtg tggtcccgcg ggcagcggcg caagatggcc   180
caggagaacc ccaagatgca caactcggag atcagcaagc gcctgggcgc cgagtggaaa   240
cttttgtcgg agacggagaa gcggccgttc atcgacgagg ctaagcggct gcgagcgctg   300
cacatgaagg agcaccccga ttataaatac cggccccggc ggaaaaccaa gacgctcatg   360
aagaaggata agtacacgct gccccggggg ctgctggccc ccggcggcaa tagcatggcg   420
agcggggtcg gggtgggcgc cggcctgggc gcgggcgtga accagcgcat ggacagttac   480
gcgcacatga acggctggag caacggcagc tacagcatga tgcaggacca gctgggctac   540
ccgcagcacc cgggcctcaa tgcgcacggc gcagcgcaga tgcagcccat gcaccgctac   600
gacgtgagcg ccctgcagta caactccatg accagctcgc agacctacat gaacggctcg   660
cccacctaca gcatgtccta ctcgcagcag ggcaccccctg gcatggctct tggctccatg   720
ggttcggtgg tcaagtccga ggccagctcc agccccctg tggttacctc ttcctcccac   780
tccagggcgc cctgccaggc cggggacctc cgggacatga tcagcatgta tctccccggc   840
gccgaggtgc cggaacccgc cgccccagc agacttcaca tgtcccagca ctaccagagc   900
ggcccggtgc cggcacggc cattaacggc acactgcccc tctcacacat g            951

SEQ ID NO: 33           moltype = AA  length = 264
FEATURE                 Location/Qualifiers
source                  1..264
                        mol_type = protein
                        organism = Homo sapiens
SEQUENCE: 33
MLSHNTMMKQ RKQQATAIMK EVHGNDVDGM DLGKKVSIPR DIMLEELSHL SNRGARLFKM    60
RQRRSDKYTF ENFQYQSRAQ INHSIAMQNG KVDGSNLEGG SQQAPLTPPN TPDPRSPPNP   120
DNIAPGYSGP LKEIPPEKFN TTAVPKYYQS PWEQAISNDP ELLEALYPKL FKPEGKAEPL   180
DYRSFNRVAT PFGGFEKASR MVKFKVPDFE LLLLTDPRFM SFVNPLSGRR SFNRTPKGWI   240
SENIPIVITT EPTDDTTVPE SEDL                                          264

SEQ ID NO: 34           moltype = DNA  length = 792
FEATURE                 Location/Qualifiers
```

|   |   |   |
|---|---|---|
| source | 1..792 | |
| | mol_type = unassigned DNA | |
| | organism = Homo sapiens | |

SEQUENCE: 34

```
atgctatcac ataatactat gatgaagcag agaaaacagc aagcaacagc catcatgaag  60
gaagtccatg gaaatgatgt tgatggcatg gacctgggca aaaaggtcag catcccagat 120
gacatcatgt tggaagaatt atcccatctc agtaaccgtg gtgccaggct atttaagatg 180
cgtcaaagaa gatctgacaa atacacattt gaaaatttcc agtatcaatc tagagcacaa 240
ataaatcaca gtattgctat gcagaatggg aaagtggatg gaagtaacat ggaaggtggt 300
tcgcagcaag cccccttgac tcctcccaac accccagatc cacgaagccc tccaaatcca 360
gacaacattg ctccaggata ttctggacca ctgaaggaaa ttcctcctga aaaattcaac 420
accacagctg tccctaagta ctatcaatct ccctgggaac aagccattag caatgatccg 480
gagcttttag aggcttata tcctaaactt tcaagcctg aaggaaaggc agaactgcct 540
gattacagga gctttaacag ggttgccaca ccattggag tgtttgaaaa agcatcaaga 600
atggttaaat ttaaagttcc agattttgag ctactattgc taacagatcc caggtttatg 660
tcctttgtca atcccctttc tggcagacgg tcctttaata ggactcctaa gggatggata 720
tctgagaata ttcctatagt gataacaacc gaacctacag atgataccac tgtaccagaa 780
tcagaagacc ta                                                   792
```

|   |   |   |
|---|---|---|
| SEQ ID NO: 35 | moltype = AA   length = 83 | |
| FEATURE | Location/Qualifiers | |
| source | 1..83 | |
| | mol_type = protein | |
| | organism = Homo sapiens | |

SEQUENCE: 35

```
MSFFQLLMKR KELIPLVVFM TVAAGGASSF AVYSLWKTDV ILDRKKNPEP WETVDPTVPQ  60
KLITINQQWK PIEELQNVQR VTK                                        83
```

|   |   |   |
|---|---|---|
| SEQ ID NO: 36 | moltype = DNA   length = 249 | |
| FEATURE | Location/Qualifiers | |
| source | 1..249 | |
| | mol_type = unassigned DNA | |
| | organism = Homo sapiens | |

SEQUENCE: 36

```
atgagctttt tccaactcct gatgaaaagg aaggaactca ttcccttggt ggtgttcatg  60
actgtggcgg cgggtggagc ctcatctttc gctgtgtatt ctctttggaa aaccgatgtg 120
atccttgatc gaaaaaaaaa tccagaacct tgggaaactg tggacccta gtgtacctcaa 180
aagcttataa caatcaacca acaatggaaa cccattgaag agttgcaaaa tgtccaaagg 240
gtgaccaaa                                                       249
```

|   |   |   |
|---|---|---|
| SEQ ID NO: 37 | moltype = AA   length = 653 | |
| FEATURE | Location/Qualifiers | |
| source | 1..653 | |
| | mol_type = protein | |
| | organism = Homo sapiens | |

SEQUENCE: 37

```
MAAAAASHLN LDALREVLEC PICMESFTEE QLRPKLLHCG HTICRQCLEK LLASSINGVR  60
CPFCSKITRI TSLTQLTDNL TVLKIIDTAG LSEAVGLLMC RSCGRRLPRQ FCRSCGLVLC 120
EPCREADHQP PGHCTLPVKE AAEERRRDFG EKLTRLRELM GELQRRKAAL EGVSKDLQAR 180
YKAVLQEYGH EERRVQDELA RSRKFFTGSL AEVEKSNSQV VEEQSYLLNI AEVQAVSRCD 240
YPLAKIKQAD VALLEETADE EEPELTASLP RELTLQDVEL LKVGHVGPLQ IGQAVKKPRT 300
VNVEDSWAME ATASASTSV TFREMDMSPE EVVASPRASP AKQRGPEEAS NIQQCLFLKK 360
MGAKGSTPGM FNLPVSLYVT SQGEVLVADR GNYRIQVFTR KGFLKEIRRS PSGIDSFVLS 420
FLGADLPNLT PLSVAMNCQG LIGVTDSYDN SLKVYTLDGH CVACHRSQLS KPWGITALPS 480
GQFVVTDVEG GKLWCFTVDR GSGVVKYSCL CSAVRPKFVT CDAEGTVYFT QGLGLNLENR 540
QNEHHLEGGF SIGSVGPDGQ LGRQISHFFS ENEDFRCIAG MCVDARGDLI VADSSRKEIL 600
HFPKGGGYSV LIREGLTCPV GIALTPKGQL LVLDCWDHCI KIYSYHLRRY STP       653
```

|   |   |   |
|---|---|---|
| SEQ ID NO: 38 | moltype = DNA   length = 1959 | |
| FEATURE | Location/Qualifiers | |
| source | 1..1959 | |
| | mol_type = unassigned DNA | |
| | organism = Homo sapiens | |

SEQUENCE: 38

```
atggctgcag cagcagcttc tcacctgaac ctggatgccc tccggagagt gctagaatgc  60
cccatctgca tggagtcctt cacagaagag cagctgcgtc caagcttct gcactgtggc 120
cataccatct gccgccagtg cctggagaag ctattggcca gtagcatcaa tggtgtccgc 180
tgtccctttt gcagcaagat taccgcata accagcttga cccagctgac agacaatctg 240
acagtgctaa agatcattga tacagctggg ctcagcgagg ctgtgggcct gctcatgtgc 300
cggtcctgtg gcggcgtct gccccggcaa ttctgccgga gctgtggttt ggtgttatgt 360
gagccctgcc gggaggcaga ccatcagcct cctggccact gtacactccc tgtcaaagaa 420
gcagctgagg agcggcgtcg ggactttgga gagaagttaa ctcgtctgcg ggaacttatg 480
gggagctgca gcggcggaa ggcagccttg aaggtgtct ccaaggacct tcaggcaagg 540
tataaagcag ttctccagga gtatgggcat gaggagcgca gggctgtca gcatcaggt  600
cgctctcgga agttcttcac aggctcttg gctgaagttg agaagtccaa tagtcaagtg 660
gtagaggagc agagttacct gcttaacatt gcagaggtgc aggctgtgtc tcgctgtgac 720
tacttcctgg ccaagatcaa gcaggcagat gtagcactac tggaggagac agctgatgag 780
gaggagccag agctcactgc cagcttgcct cgggagctca cctgcaaga tgtggagctc 840
cttaaggtag tcatgttgg ccccctcaa attggacaag ctgttaagaa gccccgggaca 900
```

```
gttaacgtgg aagattcctg ggccatggag gccacagcgt ctgctgcctc tacctctgtt  960
acttttagag agatggacat gagcccggag gaagtggttg ccagccctag ggcctcacct 1020
gctaaacagc ggggtcctga ggcagcctcc aatatccagc agtgcctctt tctcaagaag 1080
atgggggcca aaggcagcac tccaggaatg ttcaatcttc cagtcagtct ctacgtgacc 1140
agtcaaggtg aagtactagt cgctgaccgt ggtaactatc gtatacaagt ctttacccgc 1200
aaaggctttt tgaaggaaat ccgccgcagc cccagtggca ttgatagctt tgtgctaagc 1260
ttccttgggg cagatctacc caacctcact cctctctcag tggcaatgaa ctgccagggg 1320
ctgattggtg tgactgacag ctatgataac tccctcaagg tatataccct ggatggccac 1380
tgcgtggcct gtcacaggag ccagtgagc aaaccatggg gtatcacagc cttgccatct 1440
ggccagtttg tagtaaccga tgtggaaggt ggaaagcttt ggtgtttcac agttgatcga 1500
ggatcagggg tggtcaaata cagctgccta tgtagtgctg tgcggcccaa atttgtcacc 1560
tgtgatgctg agggcaccgt ctacttcacc cagggcttag gcctcaatct ggagaatcgg 1620
cagaatgagc accacctgga gggtggcttt tccattggct ctgtaggccc tgatgggcag 1680
ctgggtgccc agattagcca cttcctctcg gagaatgagg atttccgctg cattgctggc 1740
atgtgtgtgg atgctcgtgg tgatctcatc gtggctgaca gtagtcgcaa ggaaattctc 1800
cattttccta agggtggggg ctatagtgtc cttattcgag agggacttac ctgtccggtg 1860
ggcatagccc taactcctaa ggggcagctg ctggtcttgg actgttggga tcattgcatc 1920
aagatctaca gctaccatct gagaagatat tccacccca                        1959

SEQ ID NO: 39           moltype = AA  length = 445
FEATURE                 Location/Qualifiers
source                  1..445
                        mol_type = protein
                        organism = Homo sapiens
SEQUENCE: 39
MAEYDLTTRI AHFLDRHLVF PLLEFLSVKE IYNEKELLQG KLDLLSDTNM VDFAMDVYKN  60
LYSDDIPHAL REKRTTVVAQ LKQLQAETEP IVKMFEDPET TRQMQSTRDG RMLFDYLADK 120
HGFRQEYLDT LYRYAKFQYE CGNYSGAAEY LYFFRVLVPA TDRNALSSLW GKLASEILMQ 180
NWDAAMEDLT RLKETIDNNS VSSPLQSLQQ RTWLIHWSLF VFFNHPKGRD NIIDLFLYQP 240
QYLNAIQTMC PHILRYLTTA VITNKDVRKR RQVLKDLVKS IQQESYTYKD PITEFVECLY 300
VNFDFDGAQK KLRECESVLV NDFFLVACLE DFIENARLFI FETFCRIHQC ISINMLADKL 360
NMTPEEAERW IVNLIRNARL DAKIDSKLGH VVMGNNAVSP YQQVIEKTKS LSFRSQMLAM 420
NIEKKLNQNS RSEAPNWATQ DSGFY                                      445

SEQ ID NO: 40           moltype = DNA  length = 1335
FEATURE                 Location/Qualifiers
source                  1..1335
                        mol_type = unassigned DNA
                        organism = Homo sapiens
SEQUENCE: 40
atggcggagt acgacttgac tactcgcatc gcgcactttt tggatcggca tctagtcttt   60
ccgcttcttg aatttctctc tgtaaaggag atatataatg aaaaggaatt attacaaggt  120
aaattggacc ttcttagtga taccaacatg gtagacttgc tatgcatgt atacaaaaac  180
ctttattctg atgatattcc tcatgctttg agagagaaaa gaaccacagt ggttgcacaa  240
ctgaaacagc ttcaggcaga aacagaacca attgtgaaga tgtttgaaga tccagaaact  300
acaaggcaaa tgcagtcaac cagggatggt aggatgctct ttgactacct ggcggacaag  360
catggtttta ggcaggaata tttagataca ctctacagat atgcaaaatt ccagtacgaa  420
tgtgggaatt actcaggagc agcagaatat ctttattttt ttagagtgct ggttccagca  480
acagatagaa atgctttaag ttcactctgg gaaagctgg cctctgaaat cttaatgcag  540
aattgggatg cagccatgga agaccttaca cggttaaaag agaccataga taataattct  600
gtgagttctc cacttcagtc tcttcagcag agaacatgc tcattcactg gtctctgttt  660
gttttcttca atcaccccaa aggtcgcgat aatattattg acctcttcct ttatcagcca  720
caatatctta tgcaaattca gacaatgtgt ccacacattc ttcgctattt gactacagca  780
gtcataacaa acaaggatgt tcgaaaacgt cggcaggttc taaagatct agttaaagtt  840
attcaacagg agtcttacac atataaagac ccaattacag aatttgttga atgtttatat  900
gttaactttg actttgatgg ggctcagaaa aagctgaggg aatgtgaatc agtgcttgtg  960
aatgacttct tcttggtggc ttgtcttgag gatttcattg aaaatgcccg tcttcttcata 1020
tttgagactt tctgtcgcat ccaccagtgt atcagcatta acatgttggc agataaattg 1080
aacatgactc cagaagaagc tgaaaggtgg attgtaaatt tgattagaaa tgcaagactg 1140
gatgccaaga ttgattctaa attaggtcat gtggttatgg gtaacaatgc agtctcaccc 1200
tatcagcaag tgattgaaaa gaccaaaagc ctttcctta gaagccagat gttggccatg 1260
aatattgaga gaaacttaa tcagaatagc aggtcagagg ctcctaactg ggcaactcaa 1320
gattctggct ctac                                                  1335

SEQ ID NO: 41           moltype = AA  length = 156
FEATURE                 Location/Qualifiers
source                  1..156
                        mol_type = protein
                        organism = Homo sapiens
SEQUENCE: 41
MKEPLDGECG KAVVPQQELL DKIKEEPDNA QEYGCVQQPK TQESKLKIGG VSSVNERPIA  60
QQLNPGFQLS FASSGPSVLL PSVPAVAIKV FCSGCKKMLY KGQTAYHKTG STQLFCSTRC 120
ITRHSSPACL PPPPKKTCTN CSKYKILNIP FYFTFF                           156

SEQ ID NO: 42           moltype = DNA  length = 468
FEATURE                 Location/Qualifiers
source                  1..468
                        mol_type = unassigned DNA
                        organism = Homo sapiens
```

-continued

```
SEQUENCE: 42
atgaaagaac ctttggatgg tgaatgtggc aaagcagtgg taccacagca ggagcttctg    60
gacaaaatta agaagaacc agacaatgct caagagtatg gatgtgtcca acagccaaaa    120
actcaagaaa gtaaattgaa aattggtggt gtgtcttcag ttaatgagag acctattgcc    180
cagcagttga acccaggctt tcagctttct tttgcatcat ctggcccaag tgtgttgctt    240
ccttcagttc cagctgttgc tattaaggtt ttttgttctg gttgtaaaaa aatgctttat    300
aagggccaaa ctgcatatca taagacagga tctactcagc tcttctgctc cacacgatgc    360
atcaccagac attcttcacc tgcctgcctg ccacctcctc ccaagaaaac ctgcacaaac    420
tgctcgaagt ataaaattct taacatccct ttttacttta ccttttttt               468

SEQ ID NO: 43           moltype = AA  length = 155
FEATURE                 Location/Qualifiers
source                  1..155
                        mol_type = protein
                        organism = Homo sapiens
SEQUENCE: 43
MQPSPPPTEL VPSERAVVLL SCALSALGSG LLVATHALWP DLRSRARRLL LFLSLADLLS    60
AASYFYGVLQ NFAGPSWDCV LQGALSTFAN TSSFFWTVAI ALYLYLSIVR AARGPRTDRL   120
LWAFHVVRWV AVALLFQEPP TQADPSRSCP PRGRV                             155

SEQ ID NO: 44           moltype = DNA  length = 465
FEATURE                 Location/Qualifiers
source                  1..465
                        mol_type = unassigned DNA
                        organism = Homo sapiens
SEQUENCE: 44
atgcagccgt ccccgccgcc caccgagctg gtgccgtcgg agcgcgccgt ggtgctgctg    60
tcgtgcgcac tctccgcgct cggctcgggc ctgctggtgg ccacgcacgc cctgtggccc   120
gacctgcgca gccgggcacg gcgcctgctg ctcttcctgt cgctggccga cctgctctcg   180
gccgcctcct acttctacgg agtgctgcag aacttcgctg gactgtcgtc ggactgtgtc   240
ctgcagggcg cgctgtccac cttcgccaac accagctcct tcttctggac cgtggccatt   300
gcgctctact tgtacctcag catcgtccgc gccgcgcgcg gcctcgcac agatcgcctc   360
ctttgggcct tccatgtcgt caggtgggtg cggtggcgc tgcttttcca ggagcccccg    420
acacaggcca cccctcccg tcttgccct cccagaggcc gcgtc                    465

SEQ ID NO: 45           moltype = AA  length = 675
FEATURE                 Location/Qualifiers
source                  1..675
                        mol_type = protein
                        organism = Homo sapiens
SEQUENCE: 45
MDTKSILEEL LLKRSQQKKK MSPNNYKERL FVLTKTNLSY YEYDKMKRGS RKGSIEIKKI    60
RCVEKVNLEE QTPVERQYPF QIVYKDGLLY VYASNEESRS QWLKALQKEI RGNPHLLVKY   120
HSGFFVDGKF LCCQQSCKAA PGCTLWEAYA NLHTAVNEEK HRVPTFPDRV LKIPRAVPVL   180
KMDAPSSSTT LAQYDNESKK NYGSQPPSSS TSLAQYDSNS KKIYGSQPNF NMQYIPREDF   240
PDWWQVRKLK SSSSSEDVAS SNQKERNVNH TTSKISWEFP ESSSSEEEEN LDDYDWFAGN   300
ISRSQSEQLL RQKGKEGAFM VRNSSQVGMY TVSLFSKAVN DKKGTVKHYH VHTNAENKLY   360
LAENYCFDSI PKLIHYHQHN SAGMITRLRH PVSTKANKVP DSVSLGNGIW ELKREEITLL   420
KELGSGQFGV VQLGKWKGQY DVAVKMIKEG SMSEDEFFQE AQTMMKLSHP KLVKFYGVCS   480
KEYPIYIVTE YISNGCLLNY LRSHGKGLEP SQLLEMCYDV CEGMAFLESH QFIHRDLAAR   540
NCLVDRDLCV KVSDFGMTRY VLDDQYVSSV GTKFPVKWSA PEVFHYFKYS SKSDVWAFGI   600
LMWEVFSLGK QPYDLDNSQ VVLKVSQGHR LYRPHLASDT IYQIMYSCWH ELPEKRPTFQ   660
QLLSSIEPLR EKDKH                                                   675

SEQ ID NO: 46           moltype = DNA  length = 2025
FEATURE                 Location/Qualifiers
source                  1..2025
                        mol_type = unassigned DNA
                        organism = Homo sapiens
SEQUENCE: 46
atggatacaa aatctattct agaagaactt cttctcaaaa gatcacagca aaagaagaaa    60
atgtcaccaa ataattacaa agaacggctt tttgttttga ccaaaacaaa cctttcctac   120
tatgaatatg acaaaatgaa aaggggcagc agaaaaggat ccattgaaat taagaaaatc   180
agatgtgtgg agaaagtaaa tctcgaggag cagacgcctg tagaagacaa gtaccatt     240
cagattgtct ataagatgg gcttctctat gtctatgcat caaatgaaga gagccgaagt   300
cagtggttga agcattaca aaaagagata agggtaacc cccacctgct ggtcaagtac   360
catagtgggt tcttcgtgga cgggaagttc ctgtgttgcc agcagagctg taaagcagcc   420
ccaggatgta cctctggga agcatatgct aatctgcata ctgcagtcaa tgaagagaaa   480
cacagagttc ccaccttccc agacagagtg ctgaagatac ctcgggcagt tcctgttctc   540
aaaatggatg caccatcttc aagtaccact ctagcccaat atgacaacga atcaagaaa   600
aactatggct cccagccacc atcttcaagt accagtctag cgcaatatga cagcaactca   660
aagaaaatct atggctccca gccaaacttc aacatgcagt atattccaag ggaagacttc   720
cctgactggt ggcaagtaag aaaactgaaa gtagcagca gcagtgaaga tgttgcaagc   780
agtaaccaaa aagagagaaa tgtaatcac accacctgac aatttcatg gagttcct     840
gagtcaagtt catctgaaga gaggaaaac ctgatgatt atgactggtt tgctggtaac   900
atctccagat cacaatctga acagttactc agacaaaagg gaaagaagg agcattatg   960
gttagaaatt cgagccaagt gggaatgtac acagtgtcct atttagtaa ggctgtgaat  1020
gataaaaag gaactgtcaa acattaccac gtgcatacaa atgctgagaa caaattatac  1080
ctggcagaaa actactgttt tgattccatt ccaaagctta ttcattatca tcaacacaat  1140
```

```
tcagcaggca tgatcacacg gctccgccac cctgtgtcaa caaaggccaa caaggtcccc   1200
gactctgtgt ccctgggaaa tggaatctgg gaactgaaaa gagaagagat taccttgttg   1260
aaggagctgg gaagtggcca gtttggagtg gtccagctgg gcaagtggaa ggggcagtat   1320
gatgttgctg ttaagatgat caaggagggc tccatgtcag aagatgaatt ctttcaggag   1380
gcccagacta tgatgaaact cagccatccc aagctggtta aattctatgg agtgtgttca   1440
aaggaatacc ccatatacat agtgactgaa tatataagca atggctgctt gctgaattac   1500
ctgaggagtc acggaaaagg acttgaacct tcccagctct tagaaatgtg ctacgatgtc   1560
tgtgaaggca tggccttctt ggagagtcac caattcatac accgggactt ggctgctcgt   1620
aactgcttgg tggacagaga tctctgtgtg aaagtatctg actttggaat gacaaggtat   1680
gttcttgatg atcagtatgt cagttcagtc ggaacaaagt ttccagtcaa gtgtgcagct   1740
ccagaggtgt tcattacttc caaatacagc agcaagtcag acgtatgggc atttgggatc   1800
ctgatgtggg aggtgttcag cctggggaag cagccctatg acttgtatga caactcccag   1860
gtggttctga aggtctccca gggccacagg ctttaccggc ccacctggc atcggacacc   1920
atctaccaga tcatgtacag ctgctggcac gagcttccag aaaagcgtcc cacatttcag   1980
caactcctgt cttccattga accacttcgg gaaaaagcc agcat                    2025

SEQ ID NO: 47              moltype = AA   length = 502
FEATURE                    Location/Qualifiers
source                     1..502
                           mol_type = protein
                           organism = Homo sapiens
SEQUENCE: 47
MASKKLGADF HGTFSYLDDV PFKTGDKFKT PAKVGLPIGF SLPDCLQVVR EVQYDFSLEK    60
KTIEWAEEIK KIEEAEREAE CKIAEAEAKV NSKSGPEGDS KMSFSKTHST ATMPPPINPI   120
LASLQHNSIL TPTRVSSSAT KQKVLSPPHI KADFNLADFE CEEDPFDNLE LKTIDEKEEL   180
RNILVGTTGP IMAQLLDNNL PRGGSGSVLQ DEEVLASER ATLDFKPLHK PNGFITLPQL    240
GNCEKMSLSS KVSLPPIPAV SNIKSLSFPK LDSDDSNQKT AKLASTFHST SCLRNGTFQN   300
SLKPSTQSSA SELNGHHTLG LSALNLDSGT EMPALTSSQM PSLSVLSVCT EESSPPNTGP   360
TVTPPNFSVS QVPNMPSCPQ AYSELQMLSP SERQCVETVV NMGYSYECVL RAMKKKGENI   420
EQILDYLFAH GQLCEKGFDP LLVEEALEMH QCSEEKMMEF LQLMSKFKEM GFELKDIKEV   480
LLLHNNDQDN ALEDLMARAG AS                                            502

SEQ ID NO: 48              moltype = DNA   length = 1506
FEATURE                    Location/Qualifiers
source                     1..1506
                           mol_type = unassigned DNA
                           organism = Homo sapiens
SEQUENCE: 48
atggcttcta agaagttggg tgcagatttt catgggactt tcagttacct tgatgatgtc    60
ccatttaaga caggagacaa attcaaaaca ccagctaaag ttggtctacc tattggcttc   120
tccttgcctg attgtttgca ggttgtcaga gaagtacagt atgacttctc tttggaaaag   180
aaaaccattg agtgggctga agagattaag aaaatcgaag aagccgagcg ggaagcagag   240
tgcaaaattg cggaagcaga agctaaagtg aattctaaag gtggcccaga gggcgatagc   300
aaaatgagct tctccaagac tcacagtaca gccacaatgc cacctcctat taaccccatc   360
ctcgccagct gcagcacaa cagcatcctc acaccaactc gggtcagcag tagtgccacg    420
aaacagaaag ttctcagccc acctcacata aaggcggatt tcaatcttgc tgactttgag   480
tgtgaagaag acccatttga taatctggag ttaaaaacta ttgatgagaa ggaagagctg   540
agaaatattc tggtaggaac cactggaccc attatggctc agttattgga caataacttg   600
cccaggggag gctctgggtc tgtgttacag gatgaggagg tcctggcatc cttgaacgg   660
gcaaccctag atttcaagcc tcttcataaa cccaatggct tataacctt accacagttg   720
ggcaactgtg aaaagatgtc actgtcttcc aaagtgtccc tccccctat actgcagtta   780
agcaatatca aatccctgtc ttttccccaaa cttgactctg atgacagcaa tcagaagaca   840
gccaagctgg cgagcacttt ccatagcaca tcctgcctcc gcaatggcac gttccagaat   900
tccctaaagc cttccaccca aagcagtgcc agtgagctca tgggcatcaa cactcttggg   960
ctttcagctt tgaacttgga cagtggcaca gagatgccag cccttacatc ctcccagatg  1020
ccttccctct ctgttttgtc tgtgtgcaca gaggaatcat cacctccaaa tactggtccc  1080
acggtcaccc ctccttaatttt ctcagtgtca caagtgccca catgcccag ctgtcccag   1140
gcctattctg aactgcagat gctgtcccc agcgagcggc agtgtgtgga cgtggtc      1200
aacatgggct actcgtacga gtgtgtcctc agagccatga agaagaaagg agagaatatt  1260
gagcagattc tcgactatct ctttgcacat ggacactttt gtgagaaggg cttcgacct   1320
cttttagtgg aagaggctct ggaaatgcac cagtgttcag aagaaaagat gatggagttt  1380
cttcagttaa tgagcaaatt taaggagatg ggctttgagc tgaaagacat taggaagtt   1440
ttgctattac acaacaatga ccaggacaat gctttggaag acctcatggc tcgggcagga  1500
gccagc                                                             1506

SEQ ID NO: 49              moltype = AA   length = 555
FEATURE                    Location/Qualifiers
source                     1..555
                           mol_type = protein
                           organism = Homo sapiens
SEQUENCE: 49
MRVNGDDDSV AALSFLYDYY MGPKEKRILS SSTGGRNDQG KRYYHGMEYE TDLTPLESPT    60
HLMKFLTENV SGTPEYPDLL KKNNLMSLEG ALPTPGKAAP LPAGPSKLEA GSVDSYLLPT   120
TDMYDNGSLN SLFESIHGVP PTQRWQPDST FKDDPQESML FPDILKTSPE PPCPEDYPSL   180
KSDFEYTLGS PKAIHIKSGE SPMAYLNKGQ FYPVTLRTPA GGKGLALSSN KVKSVVMVVF   240
DNEKVPVEQL RFWKHWHSRQ PTAKQRVIDV ADCKENFNTV EHIEEVAYNA LSFVWNVNEE   300
AKVFIGVNCL STDFSSQKGV KGVPLNLQID TYDCGLGTER LVHRAVCQIK IFCDKGAERK   360
MRDDERKQFR RKVKCPDSSN SGVKGCLLSG FRGNETTYLR PETDLETPPV LFIPNVHFSS   420
LQRSGGAAPS AGPSSSNRLP LKRTCSPFTE EFEPLPSKQA KEGDLQRVLL YVRRETEEVF   480
```

```
DALMLKTPDL KGLRNAISEK YGFPEENIYK VYKKCKRGIL VNMDNNIIQH YSNHVAFLLD     540
MGELDGKIQI ILKEL                                                    555

SEQ ID NO: 50               moltype = DNA   length = 1665
FEATURE                     Location/Qualifiers
source                      1..1665
                            mol_type = unassigned DNA
                            organism = Homo sapiens
SEQUENCE: 50
atgagagtca atggagatga tgacagtgtt gcggccttga gcttcctcta tgattactac     60
atgggtccca aggagaagcg gatattgtcc tccagcactg ggggcaggaa tgaccaagga    120
aagaggtact accatggcat ggaatatgag acggacctca ctccccttga aagccccaca    180
cacctcatga aattcctgac agagaacgtg tctggaaccc cagagtaccc agatttgctc    240
aagaagaata acctgatgag cttggagggg gccttgccca ccccctggca ggcagctccc    300
ctccctgcag gccccagcaa gctggaggcc ggctctgtgg acagctacct gttacccacc    360
actgatatgt atgataatgg ctccctcaac tcctgtttg agagcattca tggggtgccg     420
cccacacagc gctggcagcc agacagcacc ttcaaagatg cccacaggga gtcgatgctc    480
ttcccagata tcctgaaaac ctccccgaa ccccatgtg acagggacta ccccagcctg      540
aaaagtgact tgaatacac cctgggctcc cccaaagcca tccacatcaa gtcaggcgag     600
tcacccatgg cctacctcaa caaggccag ttctacccg tcaccctgcg acccccagca      660
ggtggcaaag ccttgcctt gtcctccaac aaagtcaaga gtgtggtgat ggttgtcttc     720
gacaatgaga aggtcccagt agagcagctg cgcttctgga agcactggca ttccgggcaa    780
cccactgcca agcagcgggt cattgacgtg gctgactgca agaaaaactt caacactgtg    840
gagcacattg aggaggtggc ctataatgca ctgtcctttg tgtggaacgt gaatgaaagg    900
gccaaggtgt catcggcgt aaactgtctg agcacagact tttcctcaca aaggggggtg     960
aagggtgtcc ccctgaacct gcagattgac acctatgact gtgcttgag cactgagcgc    1020
ctggtacacc gtgctgtctg ccagatcaag atcttctgtg acaagggagc tgagaggaag   1080
atgcgcgatg acgagcggaa gcagttccgg aggaaggtca agtgccctga ctccagcaac   1140
agtggcgtca agggctgcct gctgtcgggc ttcaggggca atgagacgac ctaccttcgg   1200
ccagagactg acctggagac gccacccgtg ctgttcatcc caatgtgca cttctccagc    1260
ctgcagcgct ctggaggggc agccccctcg caggaccca gcagctccaa caggctgcct    1320
ctgaagcgta cctgctcgcc cttcactgag gagtttgagc ctctgccctc caagcaggcc   1380
aaggaaggca ccttcagag agttctgctg tatgtgcgga gggagactga ggaggtgttt    1440
gacgcgctca tgttgaagac ccagacctg aaggggctga ggaatgcgat ctctgagaag    1500
tatggggttcc ctgaagagaa catttacaaa gtctacaaga aatgcaagcg aggaatctta   1560
gtcaacatgg acaacaacat cattcagcat tacagcaacc acgtcgcctt cctgctggac   1620
atggggggagc tggacggcaa aattcagatc atccttaagg agctg                  1665

SEQ ID NO: 51               moltype = AA    length = 418
FEATURE                     Location/Qualifiers
source                      1..418
                            mol_type = protein
                            organism = Homo sapiens
SEQUENCE: 51
MRSLLLLSAF CLLEAALAAE VKKPAAAAAP GTAEKLSPKA ATLAERSAGL AFSLYQAMAK     60
DQAVENILVS PVVASSLGL VSLGGKATTA SQAKAVLSAE QLRDEEVHAG LGELLRSLSN     120
STARNVTWKL GSRLYGPSSV SFADDFVRSS KQHYNCEHSK INFRDKRSAL QSINEWAAQT   180
TDGKLPEVTK DVERTDGALL VNAMFFKPHW DEKFHHKMVD NRGFMVTRSY TVGVMMMHRT   240
GLYNYYDDEK EKLQIVEMPL AHKLSSLIIL MPHHVEPLER LEKLLTKEQL KIWMGKMQKK    300
AVAISLPKGV VEVTHDLQKH LAGLGLTEAI DKNKADLSRM SGKKDLYLAS VFHATAFELD   360
TDGNPFDQDI YGREELRSPK LFYADHPFIF LVRDTQSGSL LFIGRLVRPK GDKMRDEL     418

SEQ ID NO: 52               moltype = DNA   length = 1254
FEATURE                     Location/Qualifiers
source                      1..1254
                            mol_type = unassigned DNA
                            organism = Homo sapiens
SEQUENCE: 52
atgcgctccc tcctgcttct cagcgccttc tgcctcctgg aggcggccct ggccgccgag     60
gtgaagaaac ctgcagccgc agcagctcct ggcactgcgg agaagttgag ccccaaggcg    120
gccacgcttg ccgagcgcag cgccggcctg gccttcagct tgtaccagc catggccaag    180
gaccaggcag tggagaacat cctggtgtca ccgtggtgg tggcctcgtc gctgggctc      240
gtgtcgctgg gcggcaaggc gaccacggcg tcgcaggcca aggcagtgct gagcgccgag    300
cagctgcgcg acgaggaggt gcacgccggc ctgggcgagc tgctgcgctc actcagcaac    360
tccacgcgc gcaacgtgac ctggaagctg ggcagccgac tgtacggacc agctccagtg    420
agcttcgctg atgacttcgt gcgcagcagc aagcagcact acaactgcga gcactccaag    480
atcaacttcc gcgacaagcg cagcgcgctg cagtccatca cgagtgggc cgcgcagacc    540
accgacggca agctgcccga ggtcaccaag gacgtggagc gcacggacgg cgccctgtta   600
gtcaacgcca tgttcttcaa gccacactgg gatgagaaat tccaccacaa gatggtggac    660
aaccgtggct tcatggtgac tcggtcctat accgtgggtg tcatgatgat gcaccggaca    720
ggcctctaca ctactacga cgacgagaag gaaaagctgc aaatcgtgga gatgccctg     780
gcccacaagc tctccagcct catcatcctc atgccccatc acgtggagcc tctcgagcgc    840
cttgaaaagc tgctaaccaa agagcagctg aagatctgga tggggaagat gcagaagaag    900
gctgtttgcc aagggtgtg gtggaggtga cggcccatga tcttcagaaa cacttagcc     960
ctggctgggc tgggcctgac tgaggccatt gacaagaaca aggccgactt gtcacgcatg   1020
tcaggcaaga aggacctgta cctggccagc gtgttccacg ccaccgcctt tgagttggac   1080
acagatggca cccccttga ccaggacatc tacgggcgcg aggagctgcg cagccccaag    1140
ctgttctacg ccgaccaccc cttcatcttc tagtgcggga acacccaaag cggctccctg   1200
ctattcattg ggcgcctggt ccggcctaag ggtgacaaga tgcgagacga gtta         1254
```

```
SEQ ID NO: 53           moltype = AA   length = 636
FEATURE                 Location/Qualifiers
source                  1..636
                        mol_type = protein
                        organism = Homo sapiens
SEQUENCE: 53
MSPHPEAITD CVTLNTVGQL AEGGYPLRFS TLFQEQQKMN ISQASVSFKD VTIEFTQEEW   60
QQMAPVQKNL YRDVMLENYS NLVSVGYCCF KPEVIFKLEQ GEEPWFSEEE FSNQSHPKDY  120
RGDDLIKQNK KIKDKHLEQA ICINNKTLTT EEEKVLGKPF TLHVAAVAST KMSCKCNSWE  180
VNLQSISEFI INNRNYSTKK IGCGNVCENS PFKINFEKTQ TGEKFYEHNK NMKALNYNEN  240
LPKHPKFQTL EQAFECNKIG KAFNDKANCV KHNSSHTGET SSKDDEFRKN CDKKTLFDHR  300
RTGTGKKHLH LNQCGKSFEK STVEEYNKLN MGIKHYELNP SGNNFNRKAH LTDPQTAVIE  360
ENPLVSNDRT QTWVKSSEYH ENKKSYQTSV HRVRRRSHSM MKPYKCNECG KSFCQKGHLI  420
QHQRTHTGEK PFECSECGKT FSQKSHLSTH QRIHTAEKPY KCNECGKTFV QKSTLRGHQR  480
IHTGEKPYEC SECGKTFVQK STLRDHHRIH TGEKSFQCNQ CGKTFGQKSN LRIHQRTHTG  540
EKTYQCNECE KSFWRKDHLI QHQKTHTGEK PFKCNECGKT FARTSTLRVH QRIHTGEKPF  600
KCNECGKKFV RKAILSDHQR IHTGEKPFQC NKCGKT                           636

SEQ ID NO: 54           moltype = DNA   length = 1908
FEATURE                 Location/Qualifiers
source                  1..1908
                        mol_type = unassigned DNA
                        organism = Homo sapiens
SEQUENCE: 54
atgtcgccac atccagaagc catcacagat tgtgtgacac tgaacactgt gggccaactt   60
gcagaaggtg gttatccttt acggttctcc acactctttc aggagcagca gaaaatgaac  120
atatctcagg catcagtgtc attcaaggac gtgactatag aattcaccca ggaggagtgg  180
cagcaaaatgg cccctgttca agaatctg tacagagatg tgatgctgga gaactacagc   240
aacctcgtct cagtgggta ctgctgtttc aaaccagagg tgatcttcaa gttggagcaa   300
ggagaggagc cttggttctc agaggaggaa ttctcaaacc agagtcaccc aaaagattac   360
agaggtgatg acctgatcaa gcagaacaag aaaatcaaag acaaacactt ggagcaagca   420
atatgtatca ataataaaac attgactaca gaggaagaga agttttggg gaaaccattt    480
actctgctgt tagctgctgt tgcttcaaca aaaatgtcct gcaaatgcaa ctcatgggaa   540
gtgaatttgc aaagtatttc tgaatttatc attaataata gaaactattc aacaaagaaa   600
ataggttgcg gtaatgtatg tgagaattca cctttcaaaa ttaactttga gaaaactcag   660
actggagaga aattttatga acataataaa aacatgaaag ctctcaatta taatgaaaat   720
cttcccaagc atccaaagtt tcaaactttg gagcaagctt ttgaatgtaa taaaattgga   780
aaagcccttta atgataaggc taactgtgtt aaacataaca gttctcacac aggagaaaca   840
tcctctaaag atgatgaatt taggaaaaat tgtgataaga aaactctctt tgaccacagg   900
agaactggca gagggaagaa cacctgcatc ttaatcaat gtgggaaatc ctttgagaag    960
tcaactgtgg aggaatataa taaacttaat atgggtataa acattatga attaaatcca  1020
agtggaaata atttcaacag aaaggcacac ctcactgatc ctcaaacagc tgtcatagaa  1080
gagaacccat tggtaagtaa tgacagaaca cagactgggg ttaaatcctc tgaatatcat  1140
gaaaataaga aatcctacca gacgtcggtt cacagagttc gccgaagaag tcactcaatg  1200
atgaaaccct ataatgtaa tgaatgtggg aatccttct gtcagaaagg acatctcatt   1260
caacatcaga gaactcacac aggagagaaa ccatttgaat tggaaaaact tggaaaaact  1320
ttctcccaga agtcacacct cagtactcat cagagaattc atacagcaga aaaacccat  1380
aaatgtaatg aatgtggaaa acatttgtc cagaagtcaa ccctcagggg acatcaaaga   1440
attcacacag gagaaaaacc ctatgaatgt agtgaatgtg gaaaactttt tgttcagaag  1500
tccaccctca gagatcatca cagagggaga aatcctttca atgcaatcaa              1560
tgtggaaaaa catttggcca gaagtcaaac ctcagaatac atcagagaac tcacactggg  1620
gagaaaactt accagtgtaa tgaatgtgaa aaatccttct ggcgaaagaa tcatctcatt  1680
caacatcaga aaactcacac gggagagaaa ccattcaaat gtaacgaatg tgggaaaact  1740
tttgcccgga catcaaccct cagagtgcat caaagaattc acactgggga gaaacctttt  1800
aaatgtaacg aatgtgggaa gaaatttgtc cggaaagcaa tccttagtga tcatcagaga  1860
attcacacag gggagaaacc ctttcagtgt aataaatgtg ggaaaact                1908

SEQ ID NO: 55           moltype = AA   length = 375
FEATURE                 Location/Qualifiers
source                  1..375
                        mol_type = protein
                        organism = Homo sapiens
SEQUENCE: 55
MGCRRTREGP SKAMIFPWKC QSTQRDLWNI FKLWGWTMLC CDFLAHHGTD CWTYHYSEKP   60
MNWQRARRFC RDNYTDLVAI QNKAEIEYLE KTLPFSRSYY WIGIRKIGGI WTWVGTNKSL  120
TEEEAENWGDG EPNNKKNKED CVEIYIKRNK DAGKWNDDAC HKLKAALCYT ASCQPWSCSG  180
HGECVEIINN YTCNCDVGYY GPQCQFVIQC EPLEAPELGT MDCTHPLGNF SFSSQCAFSC  240
SEGTNLTGIE ETTCGPFGNW SSPEPTCQVI QCEPLSAPDL GIMNCSHPLA SFSFTSACTF  300
ICSEGTELIG KKKTICESSG IWSNPSPICQ KLDKSFSMIK EGDYNPLFIP VAVMVTAFSG  360
LAFIIWLARR LKKGM                                                   375

SEQ ID NO: 56           moltype = DNA   length = 1125
FEATURE                 Location/Qualifiers
source                  1..1125
                        mol_type = unassigned DNA
                        organism = Homo sapiens
SEQUENCE: 56
atgggctgca agaactag agaaggacca agcaaagcca tgatatttcc atggaaatgt     60
```

```
cagagcaccc agagggactt atggaacatc ttcaagttgt gggggtggac aatgctctgt    120
tgtgatttcc tggcacatca tggaaccgac tgctggactt accattattc tgaaaaaccc    180
atgaactggc aaagggctag aagattctgc cgagacaatt acacagattt agttgccata    240
caaaacaagg cggaaattga gtatctggag aagactctgc ctttcagtcg ttcttactac    300
tggataggaa tccggaagat aggaggaata tggacgtggg tgggaaccaa caaatctctt    360
actgaagaag cagagaactg gggagatggt gagcccaaca acaagaagaa caaggaggac    420
tgcgtggaga tctatatcaa gagaaacaaa gatgcaggca aatggaacga tgacgcctgc    480
cacaaactaa aggcagccct ctgttacaca gcttcttgcc agccctggtc atgcagtggc    540
catggagaat gtgtagaaat catcaataat tacacctgca actgtgatgt ggggtactat    600
gggcccccagt gtcagtttgt gattcagtgt gagcctttgg aggcccccaga gctgggtacc    660
atggactgta ctcacccttt gggaaacttc agcttcagct cacagtgtgc cttcagctgc    720
tctgaaggaa caaacttaac tgggattgaa gaaaccacct gtggaccatt tggaaactgg    780
tcatctccag aaccaacctg tcaagtgatt cagtgtgagc ctctatcagc accagatttg    840
gggatcatga actgtagcca tccccctggcc agcttcagcc ttacctctgc atgtaccttc    900
atctgctcag aaggaactga gttaattggg aagaagaaaa ccatttgtga atcatctgga    960
atctggtcaa atcctagtcc aatatgtcaa aaattggaca aaagtttctc aatgattaag   1020
gagggtgatt ataacccct cttcattcca gtggcagtca tggttactgc attctctggg   1080
ttggcattta tcatttggct ggcaaggaga ttaaaaaaag gtatg                   1125
```